US007283128B2

(12) United States Patent
Sato

(10) Patent No.: US 7,283,128 B2
(45) Date of Patent: Oct. 16, 2007

(54) COORDINATE INPUT APPARATUS AND CONTROL METHOD AND PROGRAM THEREOF

(75) Inventor: Hajime Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 623 days.

(21) Appl. No.: 10/901,148

(22) Filed: Jul. 29, 2004

(65) Prior Publication Data
US 2005/0030287 A1 Feb. 10, 2005

(30) Foreign Application Priority Data
Aug. 4, 2003 (JP) ............... 2003-286158

(51) Int. Cl.
*G09G 5/00* (2006.01)
(52) U.S. Cl. .................... 345/173; 178/18.01
(58) Field of Classification Search ........ 345/156–160, 345/166, 173, 174–177, 179, 182, 183, 87; 178/18.01, 18.03, 18.04, 18.09, 18.11, 19.01, 178/20.01
See application file for complete search history.

(56) References Cited
U.S. PATENT DOCUMENTS 4,507,557 A 3/1985 Tsikos ............... 250/341
6,104,386 A * 8/2000 Yaotani ................ 345/173
6,225,986 B1 * 5/2001 Sato et al. ............ 345/178
6,229,529 B1 * 5/2001 Yano et al. ........... 345/175
6,429,856 B1 8/2002 Omura et al. ......... 345/175
6,570,103 B1 5/2003 Saka et al. ........... 178/18.01
6,608,619 B2 8/2003 Omura et al. ......... 345/175
7,176,904 B2 * 2/2007 Satoh ................. 345/173
2003/0006973 A1 1/2003 Omura et al. ......... 345/175

FOREIGN PATENT DOCUMENTS
JP 2000-105671 A 4/2000
JP 2001-142642 5/2001

* cited by examiner

Primary Examiner—Richard Hjerpe
Assistant Examiner—Mansour M. Said
(74) Attorney, Agent, or Firm—Fitzpatrick, Cella, Harper & Scinto

(57) ABSTRACT

A coordinate input apparatus includes a light-receiving unit arranged in a coordinate input region, a reflection unit arranged at the peripheral portion of the coordinate input region to reflect incident light, and a light-emitting unit which illuminates the coordinate input region with light. Angle information corresponding to a point which crosses a predetermined level in a light amount distribution obtained from the light-receiving unit is calculated. The coordinates of the pointed position are calculated on the basis of, of a plurality of pieces of calculated angle information, angle information corresponding to direct reflected light from the pointing means, the direct reflected light being generated by the light-emitting unit.

7 Claims, 29 Drawing Sheets

F I G. 10
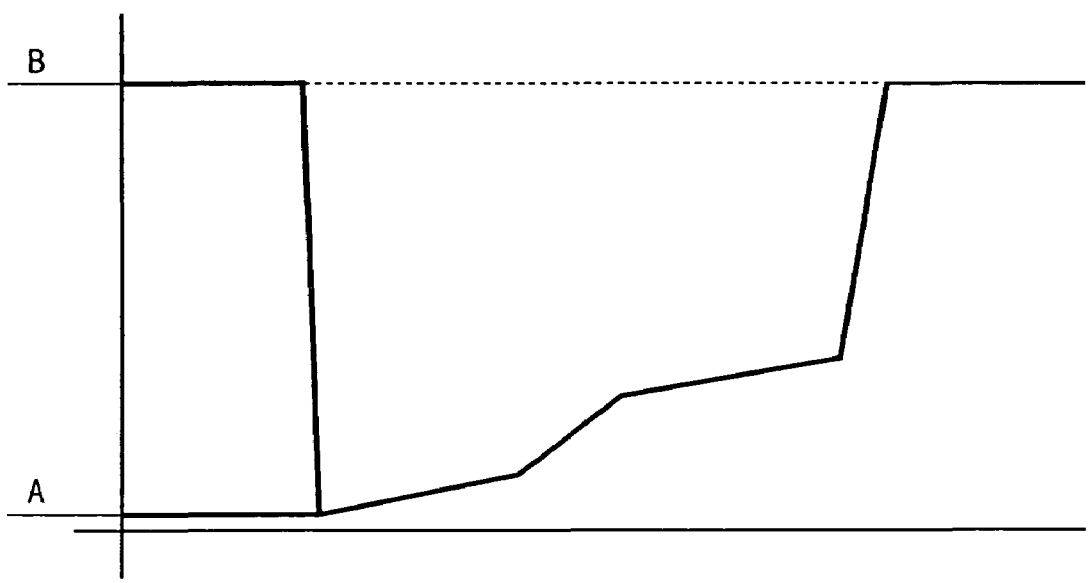

FIG. 13
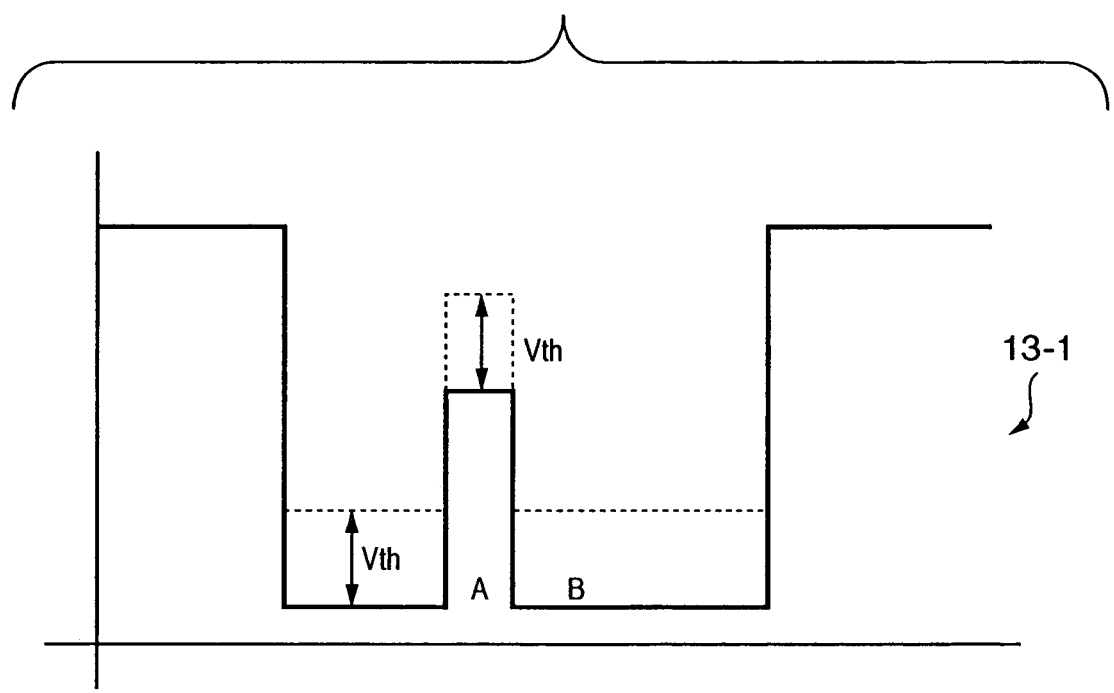
13-1
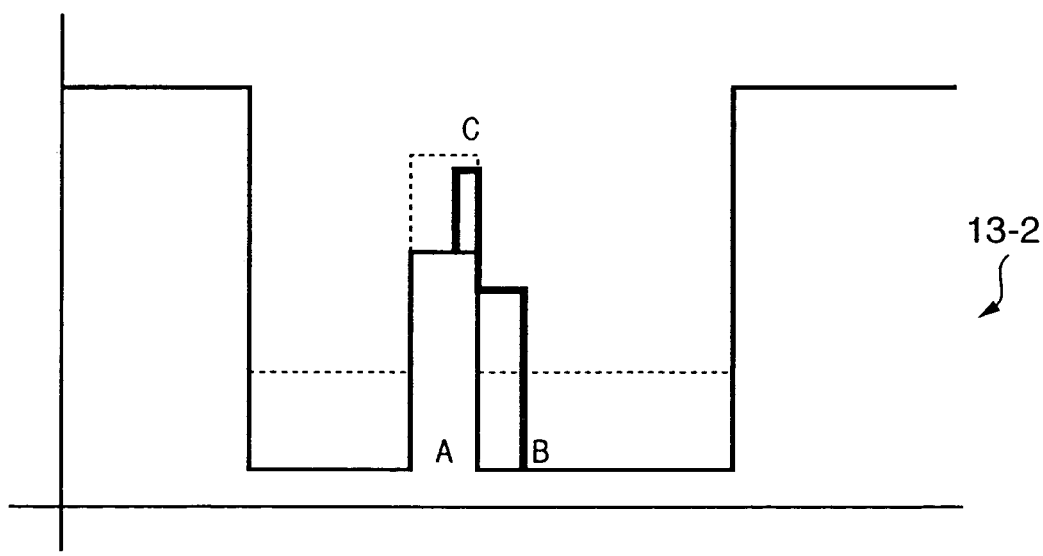
13-2

F I G. 16
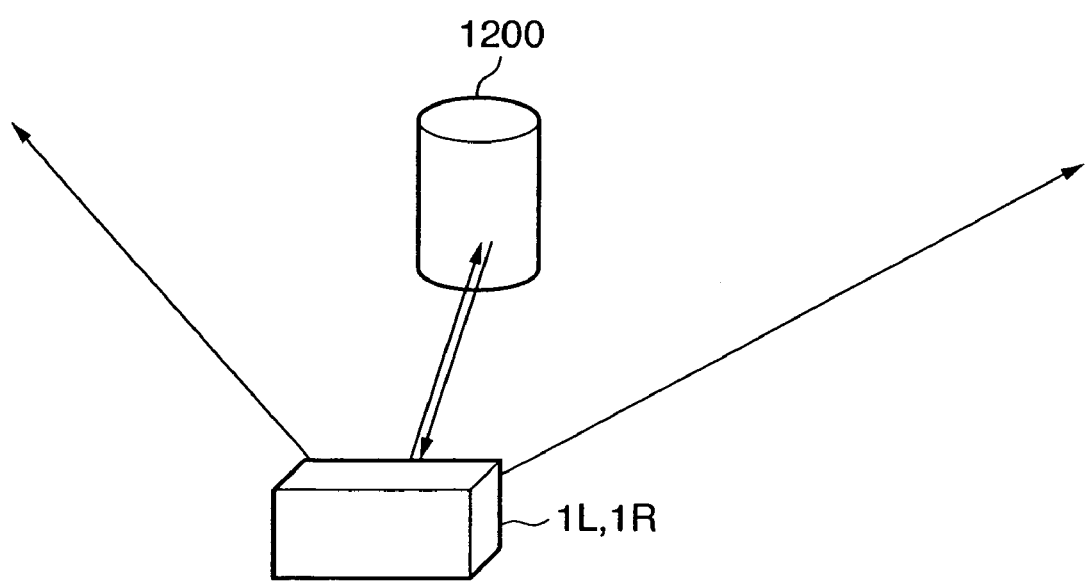

COORDINATE INPUT APPARATUS AND CONTROL METHOD AND PROGRAM THEREOF

FIELD OF THE INVENTION

The present invention relates to a coordinate input apparatus which calculates a pointed position on a coordinate input region, and a control method and program thereof.

BACKGROUND OF THE INVENTION

There exist coordinate input apparatuses which are used to input coordinates to an input surface by using a pointer or finger to control a connected computer or write characters or graphics.

Conventionally, as coordinate input apparatuses of this type, touch panels of various methods have been proposed or become commercially available. These coordinate input apparatuses are widely used because a terminal such as a personal computer can easily be operated on the screen without using any special tool.

There are various coordinate input methods using, e.g., a resistive film or an ultrasonic wave. A method using light is also known, as described in U.S. Pat. No. 4,507,557. In this method, a retroreflecting sheet is arranged outside the coordinate input region. By illumination units which are arranged at the corners of the coordinate input region to illuminate an object with light and light-receiving units which receive light, the angles between the light-receiving units and a shielding object such as a finger that-shields light in the coordinate input region are calculated. On the basis of the detection result, the pointing position of the shielding object is determined.

Japanese Patent Laid-Open No. 2000-105671 or 2001-142642 discloses an apparatus in which a retroreflecting member is arranged near the coordinate input region, and the coordinates of a point where retroreflected light is shielded are detected.

In, e.g., the apparatus described in Japanese Patent Laid-Open No. 2000-105671, the peak of a light-shielded portion by a shielding object, which is received by the light-receiving unit, is detected by waveform processing such as differential. With this processing, the angle of the light-shielded portion with respect to the light-receiving unit is detected, and the coordinates of the shielding object are calculated from the detection result. In Japanese Patent Laid-Open No. 2001-142642, comparison with a specific level pattern is done to detect one end and the other end of a light-shielded part and the center of the coordinates is detected.

In U.S. Pat. No. 4,507,557, pixels of a RAM imager serving as a light-receiving unit are read out and compared by a comparator to detect a light-shielded portion. If a light-shielded portion having a predetermined width or more is present, the center (½ position) of the pixels at the two ends is detected. On the basis of the detection result, the coordinates of the shielding object are calculated.

Assume that a thing except a finger and, for example, a pointing rod or pen with a high surface reflectance is used as a pointer (shielding object). Alternatively, assume that the nail of the finger used as a pointer is coated with a high-reflectance material such as a manicure, or the input position of the finger is near the light-receiving unit. In such cases, irradiation light from the illumination unit may directly be reflected by the surface of the pointer, and the reflected light may be detected by the light-receiving unit. At this time, the reflected light from the pointer is also detected in addition to the reflected light from the retroreflecting member, which should originally be detected by the light-receiving unit. This may cause a detection error or degrade the coordinate calculation accuracy.

SUMMARY OF THE INVENTION

The present invention has been made to solve the above problem and relates to a coordinate input apparatus which can accurately detect coordinates, and a control method and program thereof.

According to the present invention, the foregoing object is attained by providing a coordinate input apparatus which calculates a pointed position on a coordinate input region, comprising:

light-receiving means arranged in the coordinate input region;

reflection means, arranged at a peripheral portion of the coordinate input region, for reflecting incident light;

light-emitting means for illuminating the coordinate input region with light;

angle calculation means for calculating angle information on the basis of a light amount distribution obtained from the light-receiving means; and calculation means for calculating coordinates of a pointed position of pointing means on the basis of, of a plurality of pieces of angle information calculated by the angle calculation means, angle information corresponding to direct reflected light from the pointing means, the direct reflected light being generated by the light-emitting means.

In a preferred embodiment, the apparatus further comprises determination means for determining whether a light amount obtained from the light-receiving means is less than a predetermined threshold value, and control means for, when the determination means determines that the light amount is less than the predetermined threshold value, executing control to decrease a light emission amount of the light-emitting means by a predetermined amount, cause the light-emitting means to emit light, and cause the angle calculation means to execute angle calculation again for a light amount distribution obtained from the light-receiving means by the light emission.

In a preferred embodiment, the apparatus further comprises determination means for determining whether a light amount obtained from the light-receiving means is less than a predetermined threshold value, and control means for executing control to shorten a light reception time by the light-receiving means by a predetermined time and cause the angle calculation means to execute angle calculation again for a light amount distribution obtained from the light-receiving means within the predetermined time.

In a preferred embodiment, the calculation means calculates the coordinates of the pointed position on the basis of, of the plurality of pieces of angle information, angle information corresponding to a light amount level having a minus sign.

In a preferred embodiment, the calculation means calculates the coordinates of the pointed position on the basis of, of the plurality of pieces of angle information, angle information obtained by adding a predetermined value to angle information corresponding to a light amount level having a minus sign.

The apparatus further comprises display means, the display means being superposed on the coordinate input region.

According to the present invention, the foregoing object is attained by providing a control method of a coordinate input apparatus which calculates a pointed position on a coordinate input region on the basis of a light amount distribution obtained by a light-receiving unit arranged in the coordinate input region from reflected light from a reflection unit which is arranged at a peripheral portion of the coordinate input region to reflect incident light, comprising:

an angle calculation step of calculating angle information on the basis of the light amount distribution obtained from the light-receiving unit; and a calculation step of calculating coordinates of a pointed position of pointing means on the basis of, of a plurality of pieces of angle information calculated in the angle calculation step, angle information corresponding to direct reflected light from the pointing means, the direct reflected light being generated by a light-emitting unit.

According to the present invention, the foregoing object is attained by providing a program which implements control of a coordinate input apparatus which calculates a pointed position on a coordinate input region on the basis of a light amount distribution obtained by a light-receiving unit arranged in the coordinate input region from reflected light from a reflection unit which is arranged at a peripheral portion of the coordinate input region to reflect incident light, comprising:

a program code for an angle calculation step of calculating angle information on the basis of the light amount distribution obtained from the light-receiving unit; and a program code for a calculation step of calculating coordinates of a pointed position of pointing means on the basis of, of a plurality of pieces of angle information calculated in the angle calculation step, angle information corresponding to direct reflected light from the pointing means, the direct reflected light being generated by a light-emitting unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a graph showing an example of the light amount distribution obtained by the sensor unit according to the first embodiment of the present invention;

FIG. 13 is a graph for explaining a change in light amount in the light amount distribution obtained by the sensor unit according to the first embodiment of the present invention;

FIG. 16 is a view for explaining direct reflection from the pointer according to the first embodiment of the present invention;

DETAILED DESCRIPTION OF THE PREFERRED EMBODIMENTS

Preferred embodiments of the present invention will be described in detail in accordance with the accompanying drawings.

First Embodiment

Figure 1:
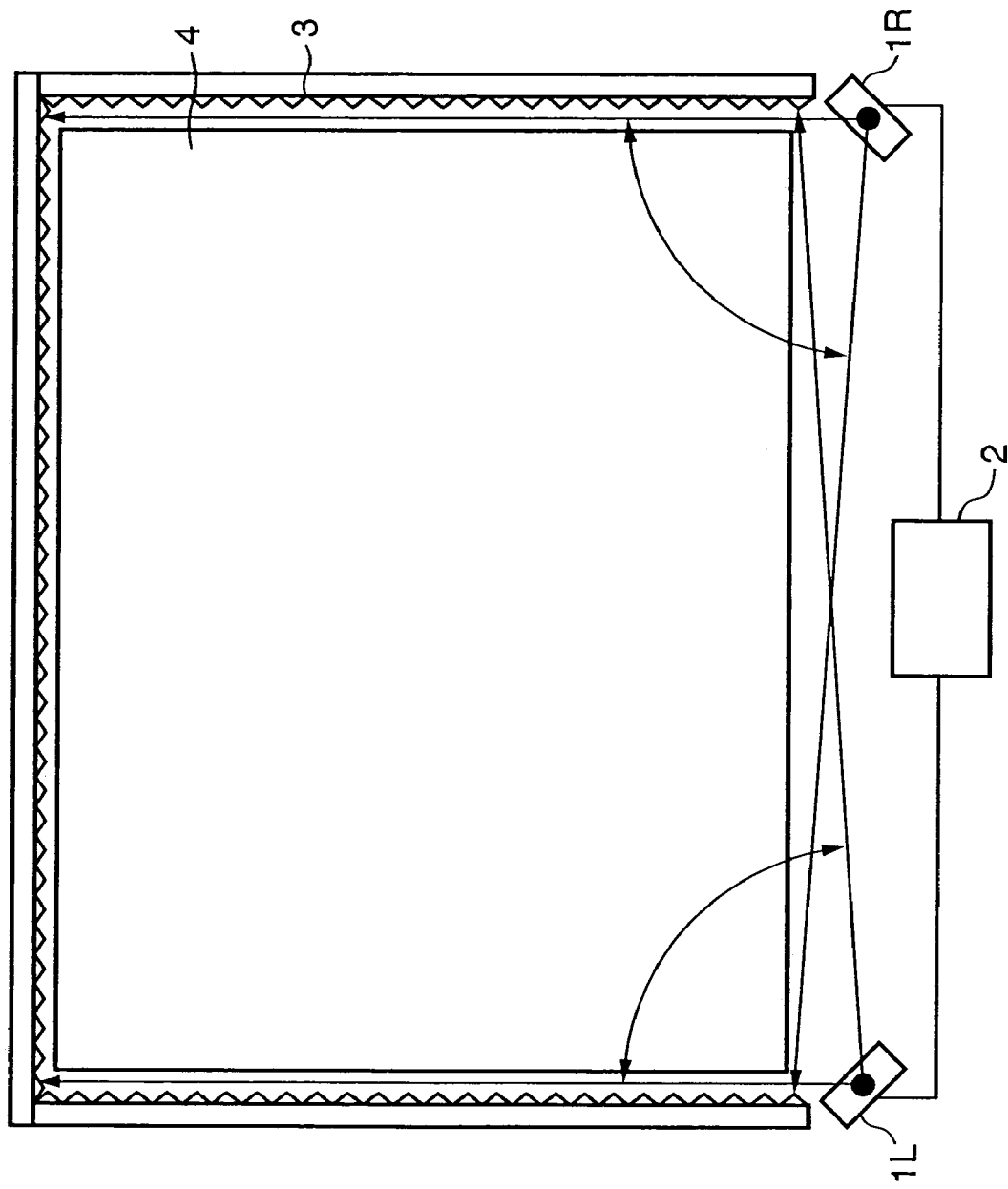
FIG. 1 is a view showing the schematic arrangement of a coordinate input apparatus according to the first embodiment of the present invention.

FIG. 1 is a view showing the schematic arrangement of a coordinate input apparatus according to the first embodiment of the present invention.

Figure 5:
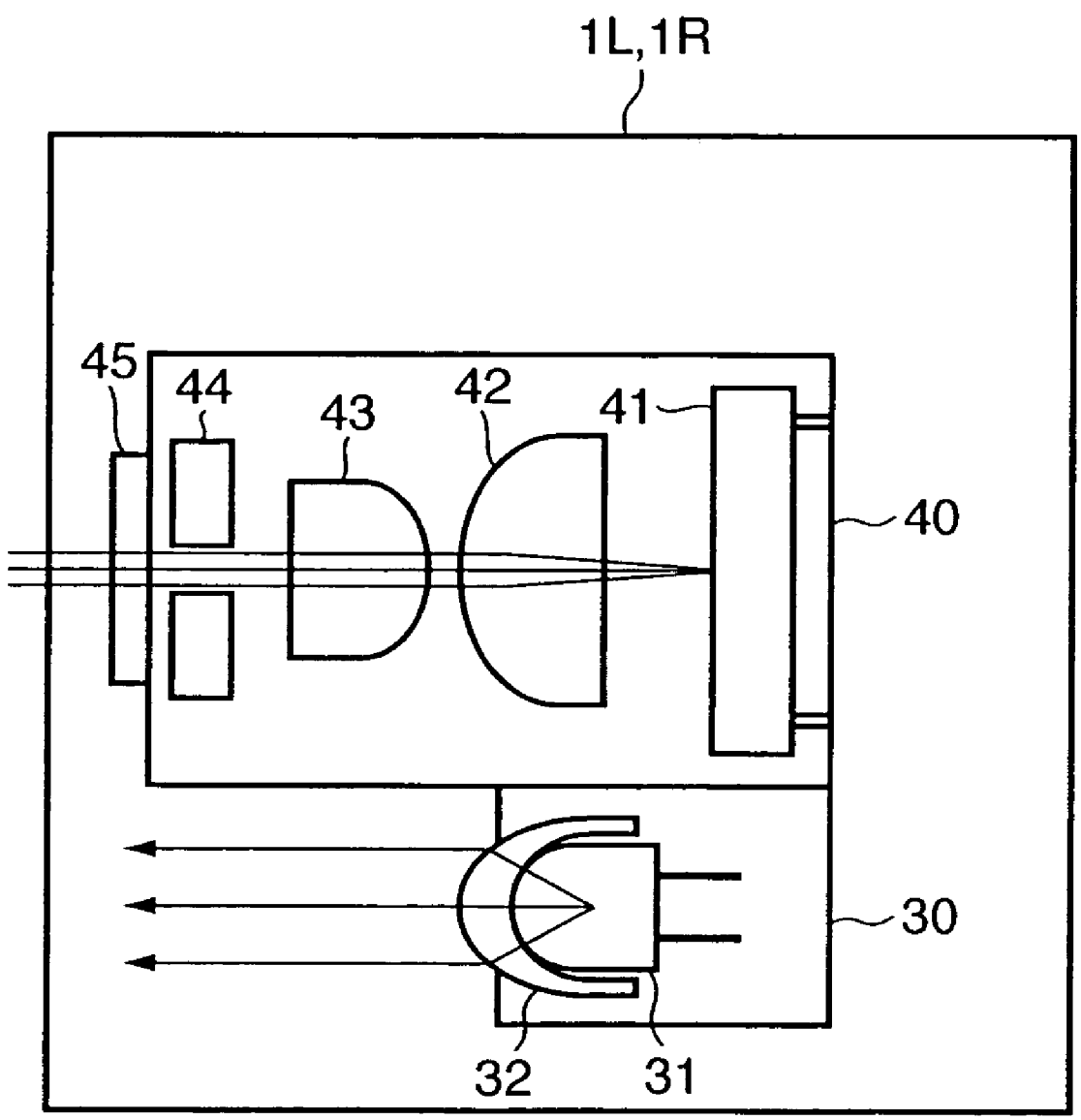
FIG. 5 is a view showing an arrangement example of the sensor unit according to the first embodiment of the present invention.

Referring to FIG. 1, each of sensor units 1L and 1R has a light projecting unit 30 and a detection unit 40 (FIG. 5). The sensor units 1L and 1R are separated by a predetermined distance. The sensor units 1L and 1R are connected to a control/arithmetic unit 2 which executes a control/arithmetic operation to receive control signals from the control/arithmetic unit 2 and transmit detected signals to the control/arithmetic unit 2.

Figure 2:
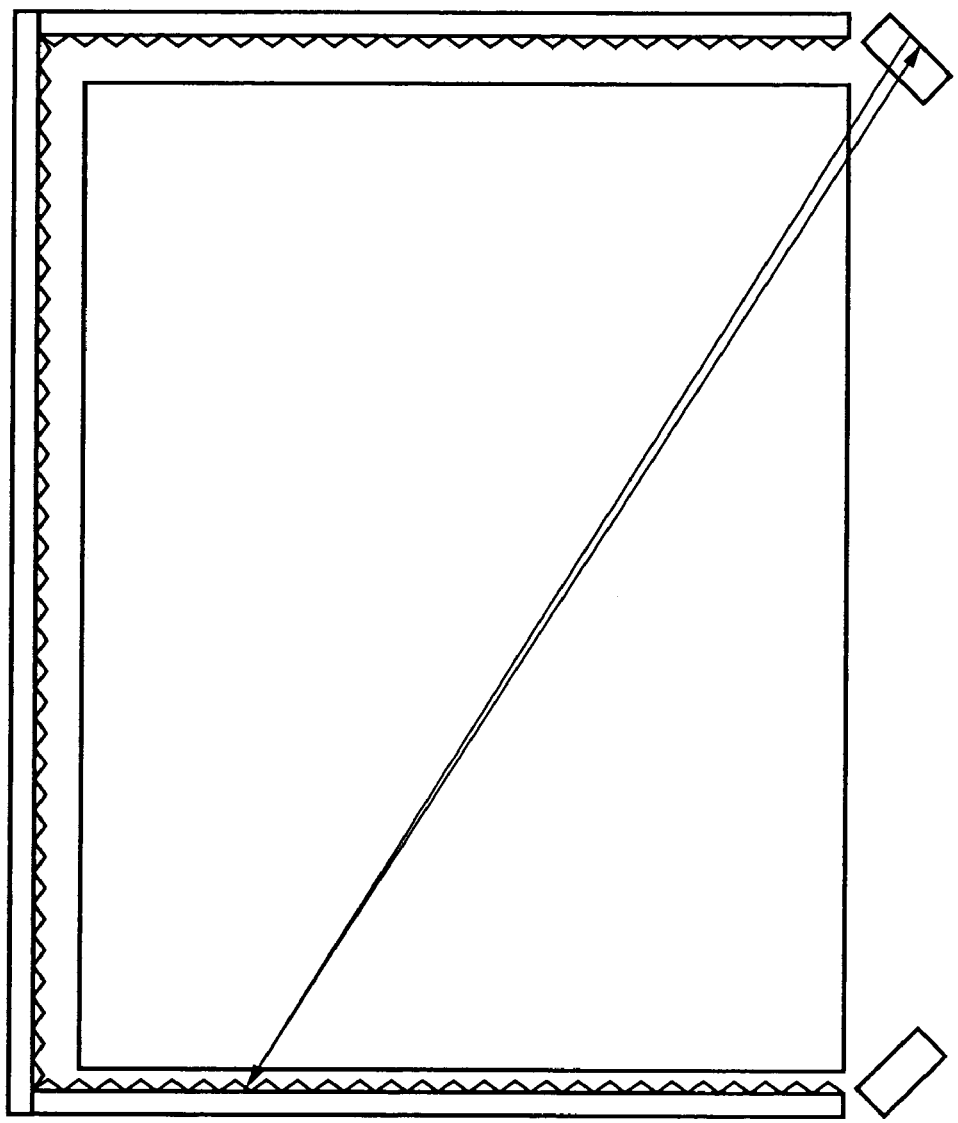
FIG. 2 is a view for explaining the operation of the retroreflecting member according to the first embodiment of the present invention.

A retroreflecting member 3 has a retroreflecting surface which reflects incident light to the arrival direction, as shown in FIG. 2. The retroreflecting member 3 retroreflects light projected from the sensor units 1L and 1R on the left and right sides within a range of about 90° toward the sensor units 1L and 1R. The reflected light is one-dimensionally detected by each of the sensor units 1L and 1R. The light amount distribution is transmitted to the control/arithmetic unit 2.

A coordinate input region 4 includes a display screen of a display device such as a PDP, rear projector, or LCD panel and can be used as an interactive input device.

In this arrangement, when input pointing by a pointer such as a finger is done in the coordinate input region 4, light projected from the light projecting units 30 of the sensor units 1L and 1R is shielded. Since reflected light by the retroreflecting member 3 is not obtained, no reflected light amount is obtained at only the input pointed position.

The control/arithmetic unit 2 detects the light-shielded range of the portion input-pointed by the pointer from the light amount change detected by the sensor units 1L and 1R. The control/arithmetic unit 2 specifies the detection point in the light-shielded range and calculates the angles of the pointer with respect to the sensor units 1L and 1R. On the basis of the calculated angles and the distance between the sensor units, the control/arithmetic unit 2 calculates the pointing position of the pointer on the coordinate input region 4 and outputs the coordinate values to an external terminal such as a personal computer connected to the display device through an interface such as USB.

In the above way, the external terminal can be operated by the pointer by drawing a line on the screen or operating an icon displayed on the display device.

<Detailed Description of Sensor Unit>

The arrangement of the light projecting unit 30 in each of the sensor units 1L and 1R will be described first with reference to FIGS. 3A and 3B.

Figure 3A:
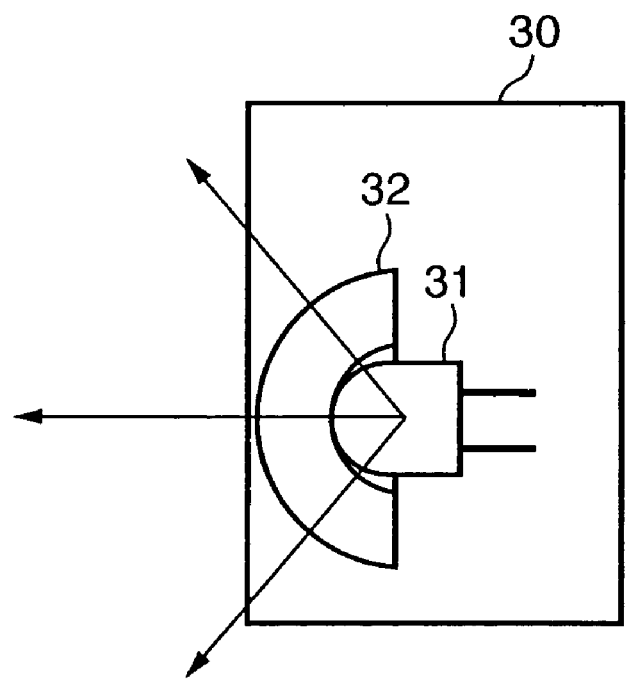
FIGS. 3A and 3B are views showing an arrangement example of the light projecting unit of the sensor unit according to the first embodiment of the present invention.
Figure 3B:
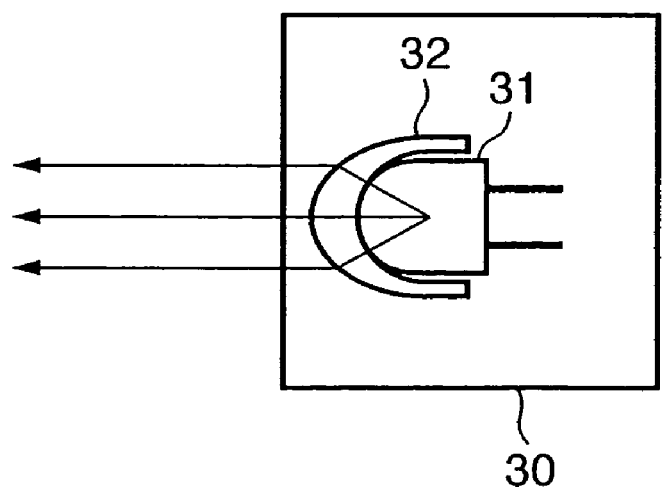

FIGS. 3A and 3B are views showing an arrangement example of the light projecting unit of the sensor unit according to the first embodiment of the present invention.

FIG. 3A shows the light projecting unit 30 viewed from the upper side (from a direction perpendicular to the input surface of the coordinate input region 4). An infrared LED 31 emits infrared light. The light emitted from the infrared LED 31 is projected in a range of about 90° by a light projecting lens 32.

FIG. 3B shows the light projecting unit 30 viewed from a side (from a direction parallel to the input surface of the coordinate input region 4). In this direction, the light from the infrared LED 31 is projected as a light beam limited in the vertical direction so that the light is mainly projected to the retroreflecting member 3.

The arrangement of the detection unit 40 in each of the sensor units 1L and 1R will be described next with reference to FIG. 4.

Figure 4:
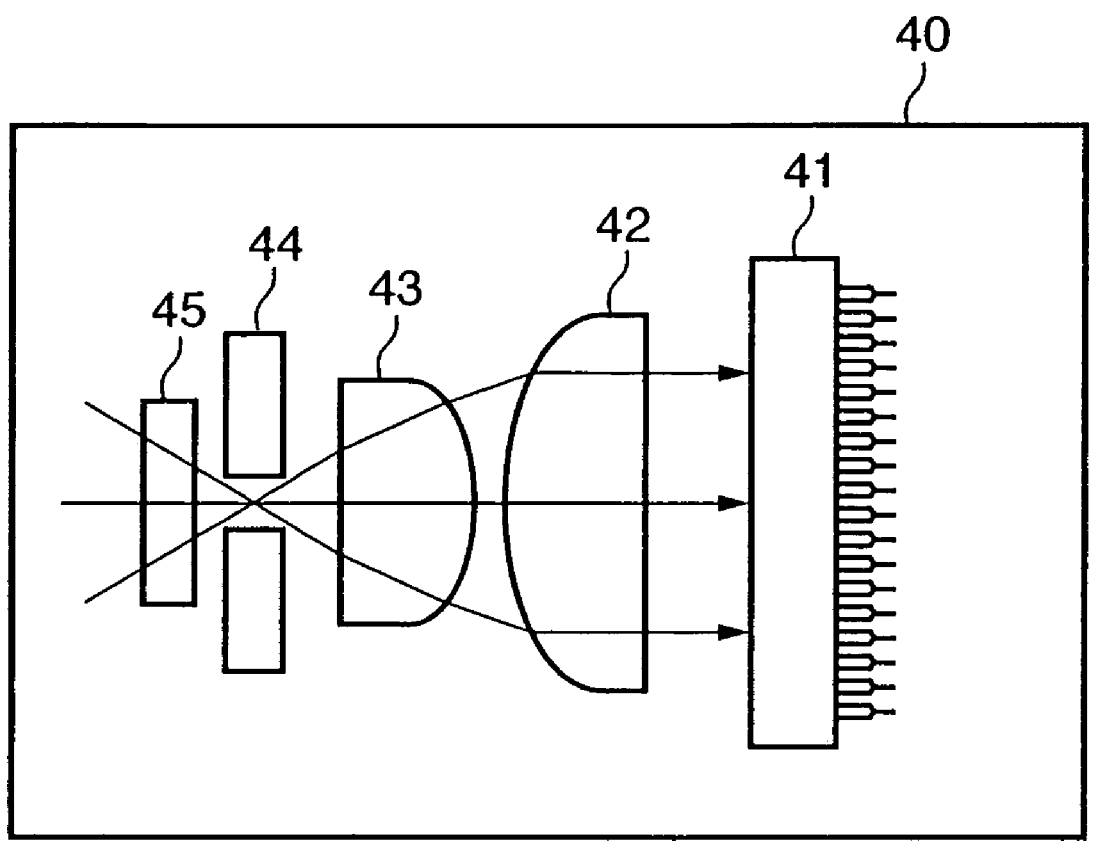
FIG. 4 is a view showing an arrangement example of the detection unit of the sensor unit according to the first embodiment of the present invention.

FIG. 4 is a view showing an arrangement example of the detection unit of the sensor unit according to the first embodiment of the present invention.

FIG. 4 shows the detection unit 40 in each of the sensor units 1L and 1R from a direction perpendicular to the input surface of the coordinate input region 4.

The detection unit 40 includes a one-dimensional line CCD 41 including a plurality of light-receiving elements (pixels), condenser lenses 42 and 43 serving as a condenser optical system, a stop 44 which limits the direction of incidence of incident light, and an infrared filter 45 which prevents incidence of extra light such as visible light.

Light from the light projecting unit 30 is reflected by the retroreflecting member 3 and passes through the infrared filter 45 and stop 44. An image of light in the range of about 90° on the input surface is formed on pixels of the detection surface of the line CCD 41 depending on the incident angle by the condenser lenses 42 and 43. This makes it possible to obtain a light amount distribution for each incident angle. That is, the pixel numbers of pixels of the line CCD 41 represent angle information.

The arrangement of each of the sensor units 1L and 1R each having the light projecting unit 30 shown in FIGS. 3A and 3B and the detection unit 40 shown in FIG. 4 will be described next with reference to FIG. 5.

FIG. 5 is a view showing an arrangement example of the sensor unit according to the first embodiment of the present invention.

FIG. 5 shows the sensor unit 1L (1R) in which the light projecting unit 30 shown in FIG. 3A and the detection unit 40 shown in FIG. 4 are stacked and viewed from the direction parallel to the input surface. The distance between the optical axis of the light projecting unit 30 and that of the detection unit 40 is set to a sufficiently detectable range on the basis of the angle characteristic of the retroreflecting member 3.

<Reflecting Member>

Figure 6:
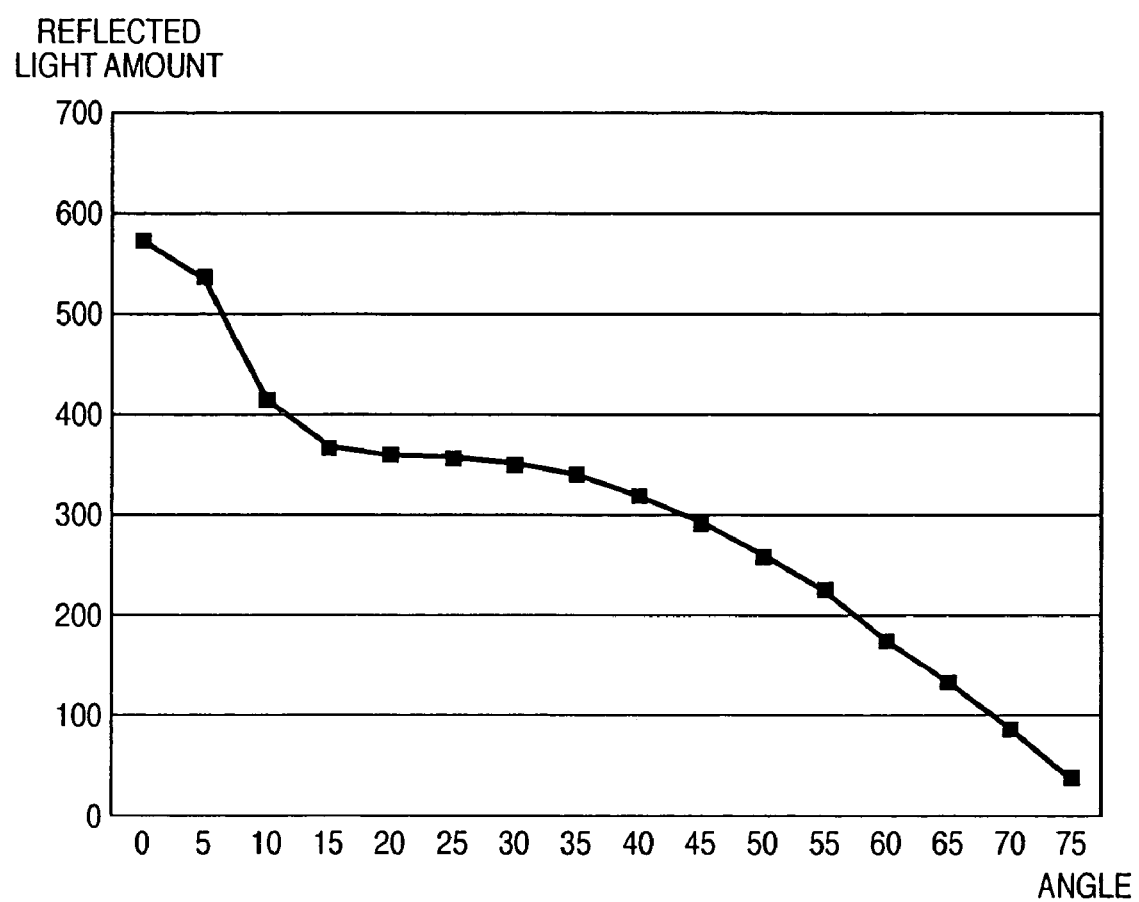
FIG. 6 is a graph showing the retroreflection characteristic for an incident angle to the retroreflecting member according to the first embodiment of the present invention.

The retroreflecting member 3 has a reflecting characteristic to an incident angle. As the reflecting characteristic, for example, when the retroreflecting member 3 has a flat tape shape, the reflected light amount decreases nearly when the incident angle of incident light on the retroreflecting member 3 exceeds 45°, as shown in FIG. 6. When the pointer is present, the change in light amount cannot sufficiently be ensured.

The reflected light amount is determined by the light amount distribution (illumination intensity and distance), the reflectance of the retroreflecting member 3 (incident angle and reflecting member width), and the imaging system illuminance in the sensor units 1L and 1R (cosine fourth law).

To solve a shortage of reflected light amount, the illumination intensity of the light projecting unit 30 is increased. However, when the reflected light amount distribution is not uniform, and light of a large light amount portion is received by the sensor unit 1L (1R), that portion may be saturated in the line CCD 41 in the sensor unit 1L (1R). Hence, there is a limitation on the increase in illuminance intensity. In other words, when the reflected light amount distribution of the retroreflecting member 3 is made as uniform as possible, the increase in reflected light amount to a small light amount portion can be expected.

Figure 7:
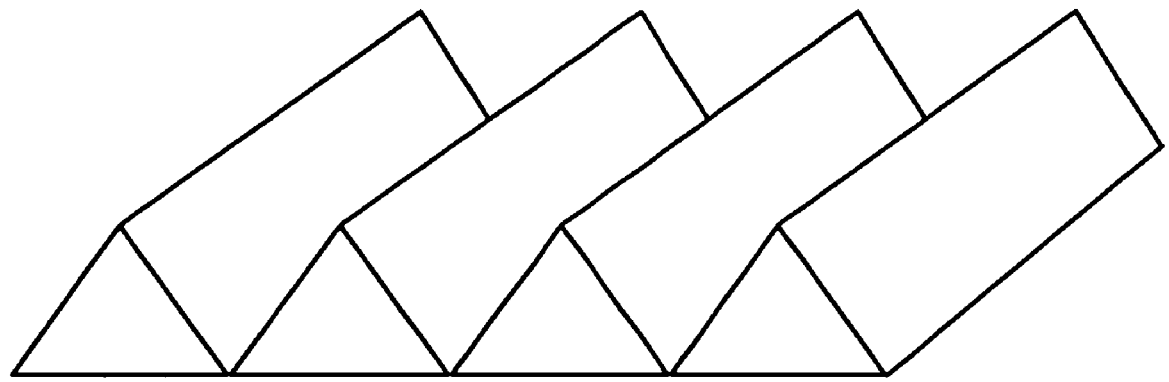
FIG. 7 is a view showing an arrangement example of the retroreflecting member according to the first embodiment of the present invention.

In the first embodiment, to uniform the reflected light amount of incident light on the retroreflecting member 3 to the incident angle direction, a retroreflecting member including a plurality of triangular prisms as shown in FIG. 7 is used. Accordingly, the reflecting characteristic to the incident angle can be improved.

The angle of each triangular prism is determined from the reflecting characteristic of the retroreflecting member. The pitch of the triangular prisms is preferably set to be equal to or less than the detection resolution of the line CCD 41 in the sensor unit.

<Description of Control/Arithmetic Unit>

The control/arithmetic unit 2 and each of the sensor units 1L and 1R mainly exchange a CCD control signal, a CCD clock signal, and an output signal for the line CCD 41 in the detection unit 40 and a driving signal for the infrared LED 31 of the light projecting unit 30.

The detailed arrangement of the control/arithmetic unit 2 will be described with reference to FIG. 8.

Figure 8:
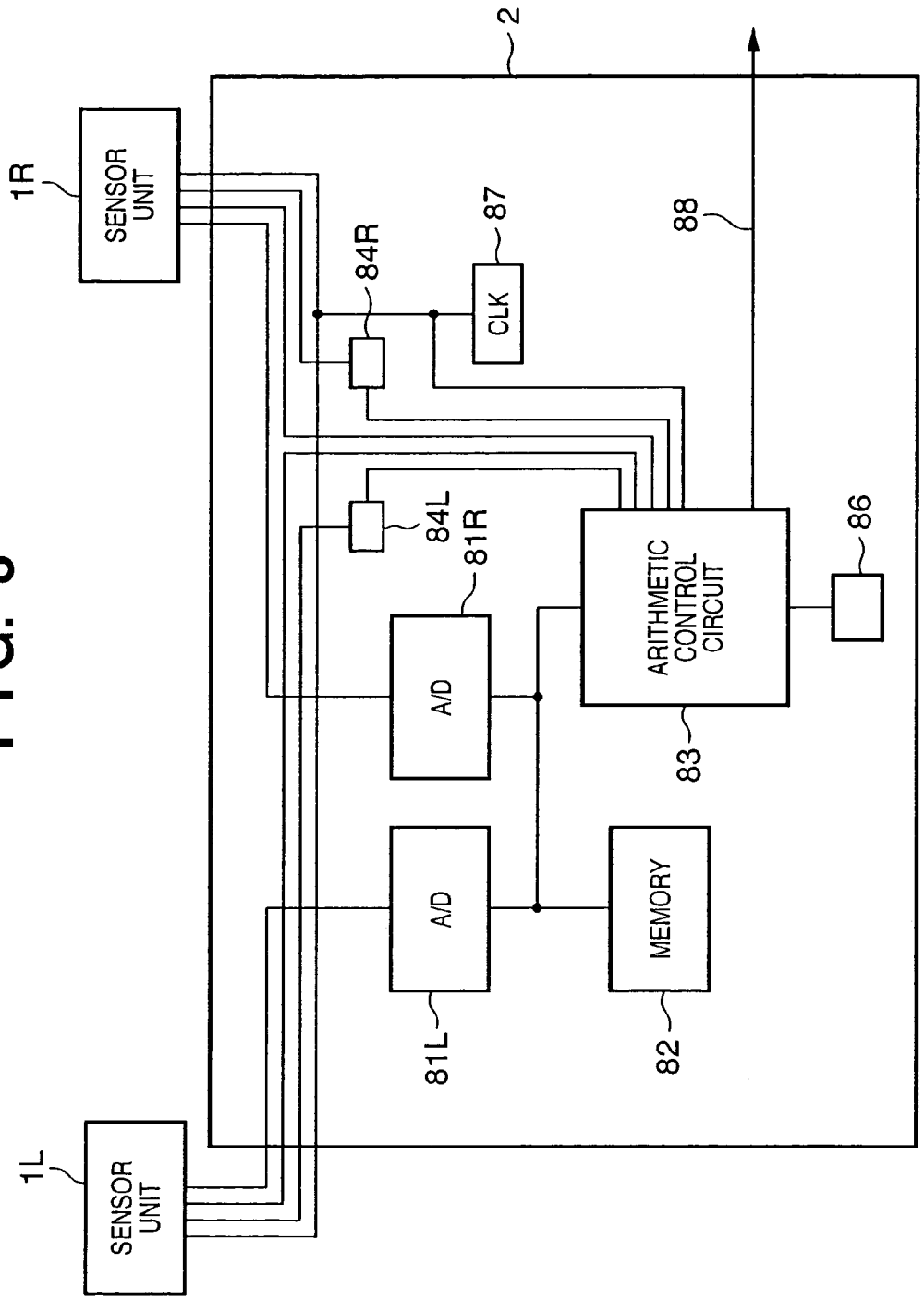
FIG. 8 is a block diagram showing the detailed arrangement of the control/arithmetic unit according to the first embodiment of the present invention.

FIG. 8 is a block diagram showing the detailed arrangement of the control/arithmetic unit according to the first embodiment of the present invention.

The CCD control signal is output from an arithmetic control circuit (CPU) 83 including a one-chip microcomputer or the like to control the shutter timing of the line CCD 41 or execute data output control. The arithmetic control circuit 83 operates in accordance with a clock signal from a main clock generation circuit 86. A CCD clock signal is transmitted from a clock generation circuit (CLK) 87 to the sensor units 1L and 1R and also input to the arithmetic control circuit 83 to execute various kinds of control in synchronism with the line CCD 41 in each sensor unit.

An LED driving signal to drive the infrared LED 31 in each light projecting unit 30 is supplied from the arithmetic control circuit 83 to the infrared LED 31 of a corresponding one of the sensor units 1L and 1R through an LED driving circuit 84L or 84R.

A detection signal from the line CCD 41 in the detection unit 40 of each of the sensor units 1L and 1R is input to a corresponding one of the A/D converters 81L and 81R of the control/arithmetic unit 2 and converted into a digital value under the control of the control/arithmetic unit 2. The converted digital value is stored in a memory 82 and used for angle calculation for the pointer. Coordinate values are calculated from the calculated angle and output to an external terminal through a serial interface 88 (e.g., a USB or RS232C interface).

<Description of Light Amount Distribution Detection>

Figure 9:
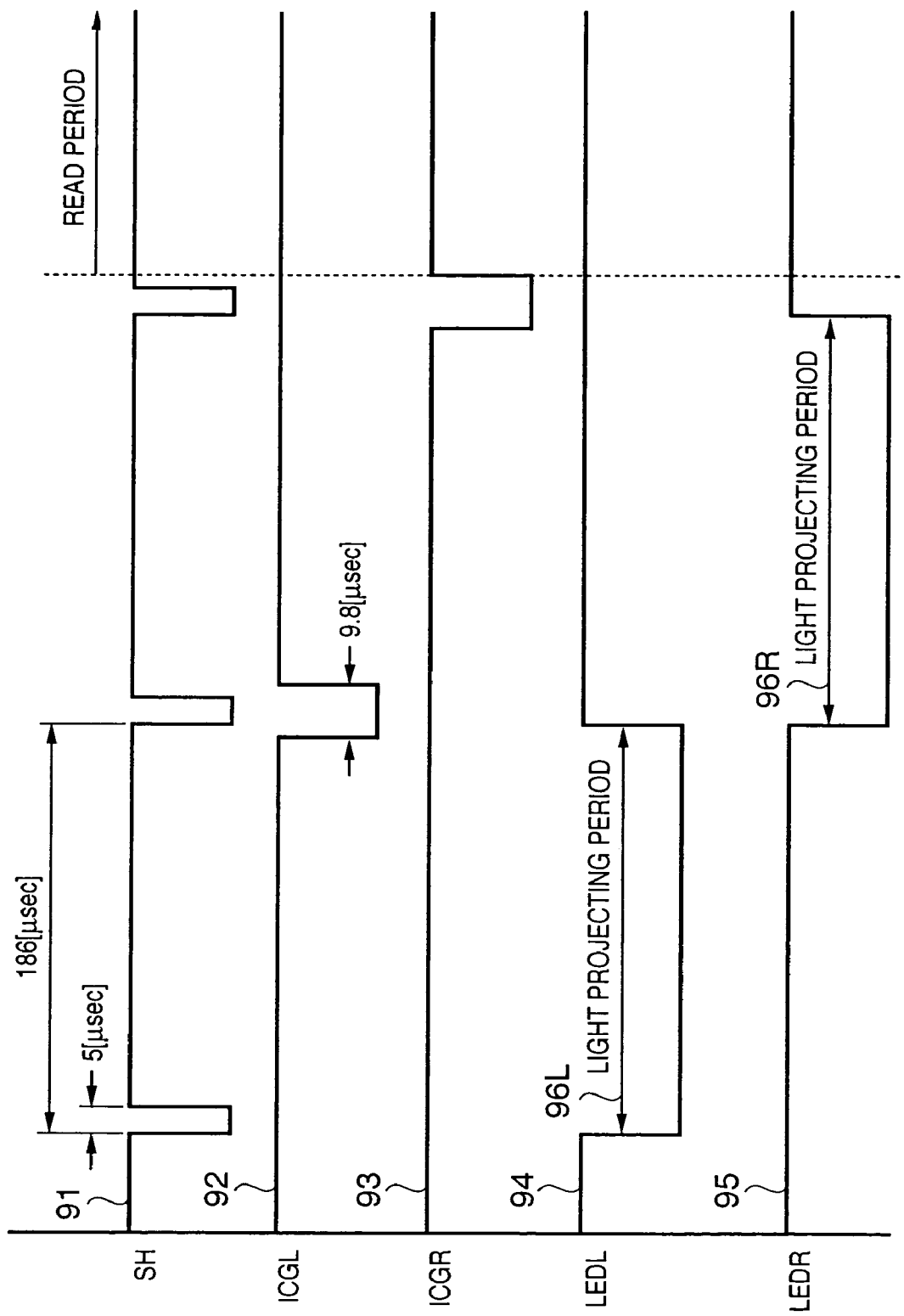
FIG. 9 is a timing chart of control signals according to the first embodiment of the present invention.

FIG. 9 is a timing chart of control signals according to the first embodiment of the present invention.

Referring to FIG. 9, reference numerals 91 to 93 denote CCD control signals. The shutter release time of the line CCD 41 is determined by the interval of the SH signal 91. The ICGL signal 92 and ICGR signal 93 are gate signals to the sensor units 1L and 1R. Each of the signals transfers charges in the photoelectric conversion unit of the line CCD 41 to the read unit.

Reference numerals 94 and 95 denote driving signals for the light projecting units 30 of the sensor units 1L and 1R. To turn on the light projecting unit 30 of the sensor unit 1L at the first period of the SH signal 91 (light projecting period 96L), the LEDL signal 94 is supplied to the light projecting unit 30 through the LED driving circuit 84L. To turn on the light projecting unit 30 of the sensor unit 1R at the next period of the SH signal 91 (light projecting period 96R), the LEDR signal 95 is supplied to the light projecting unit 30 through the LED driving circuit 84R.

After driving of the light projecting units 30 in both the sensor units 1L and 1R is ended, detection signals from the detection units (line CCDs 41) of both the sensor units 1L and 1R are read out.

When input by the pointer to the coordinate input region 4 is not executed, the detection signals read out from both the sensor units 1L and 1R have a light amount distribution shown in FIG. 10 as the outputs from the sensor units. Such a light amount distribution is not always obtained in all systems. The light amount distribution changes depending on the characteristic of the retroreflecting member 3, the characteristic of the light projecting unit 30, or a change over time (e.g., dirt on the reflecting surface).

Referring to FIG. 10, a level A is the maximum light amount, and a level B is the minimum light amount.

More specifically, when no reflected light is obtained from the retroreflecting member 3, the light amount level obtained by the sensor units 1L and 1R is almost the level B. As the reflected light amount increases, the light amount level is transited to the level A. Detection signals thus output from the sensor units 1L and 1R are A/D-converted by the A/D converters 81L and 81R and received by the control/arithmetic unit 2 as digital data.

Figure 11:
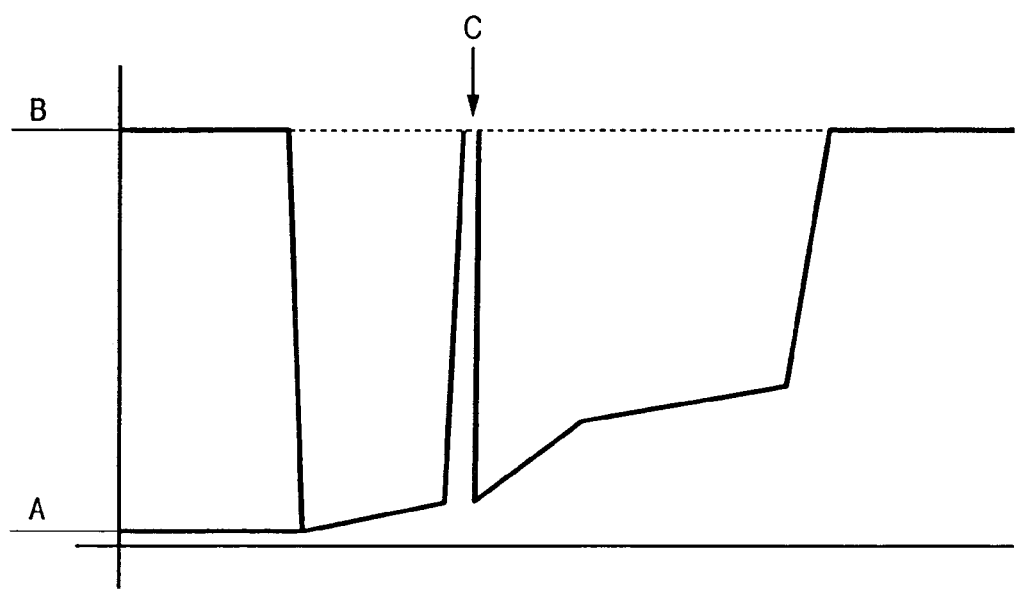
FIG. 11 is a graph showing an example of the light amount distribution obtained by the sensor unit when input according to the first embodiment of the present invention is done.

To the contrary, when input by the pointer to the coordinate input region 4 is executed, a light amount distribution shown in FIG. 11 is obtained as the outputs from the sensor units 1L and 1R.

Reflected light from the retroreflecting member 3 is shielded by the pointer at a portion C of the light amount distribution. As is apparent from FIG. 11, the reflected light amount decreases at only that portion (light-shielded range).

In the first embodiment, the angles of the pointer with respect to the sensor units 1L and 1R are calculated on the basis of the change between the light amount distribution shown in FIG. 10 when input by the pointer is not executed and the light amount distribution shown in FIG. 11 when input by the pointer is executed.

More specifically, the light amount distribution shown in FIG. 10 is stored in the memory 82 as an initial state in advance. It is detected on the basis of the difference between the light amount distribution during the sample period and that in the initial state whether the change in light amount distribution as shown in FIG. 11 is obtained during the sample period of the detection signal of each of the sensor units 1L and 1R. If the light amount distribution has changed, calculation to determine the input angle is executed by using the change portion as the input point of the pointer.

<Description of Angle Calculation>

In calculating the angles of the pointer with respect to the sensor units 1L and 1R, the light-shielded range by the pointer must be detected first.

As described above, the light amount distribution detected by each of the sensor units 1L and 1R is not constant because of factors such as a change over time. The light amount distribution in the initial state is preferably stored in the memory 82, e.g., every time the system is activated. Accordingly, except a case wherein, e.g., the retroreflecting surface of the retroreflecting member 3 is dusty and cannot completely reflect light, the light amount distribution in the latest initial state of the coordinate input apparatus can be managed in the memory 82.

Angle calculation of the pointer by one of the sensor units 1L and 1R (e.g., the sensor unit 1L) will be described below. The same angle calculation is executed by the other sensor unit (sensor unit 1R), as a matter of course.

At the time of power-on, in a state without input and in a state wherein light projection from the light projecting unit 30 in the sensor unit 1L is stopped, the light amount distribution as the output from the detection unit 40 is A/D-converted. The value is stored in the memory 82 as Bas_data[N].

This value is data containing a bias variation or the like of the detection unit (line CCD 41) and is present near the level B in FIG. 10. N indicates the pixel number of a pixel of the line CCD 41. Pixel numbers corresponding to the effective input range (effective range) are used.

Next, in a state wherein light projection from the light projecting unit 30 is executed, the light amount distribution as the output from the detection unit 40 is A/D-converted. The value is stored in the memory 82 as Ref_data[N].

This value is, e.g., data indicated by the solid line in FIG. 10.

Using Bas_data[N] and Ref_data[N] stored in the memory 82, the presence/absence of input by the pointer and the presence/absence of a light-shielded range are determined.

The pixel data of an nth pixel during the sample period of the output of the sensor unit 1L (line CCD 41) is indicated by Norm_data[N].

First, to specify the light-shielded range, the presence/absence of a light-shielded range is determined on the basis of the absolute amount of a change in pixel data. This processing is done in order to prevent any determination error by noise and detect a proper change in predetermined amount.

More specifically, the absolute amount of a change in pixel data is calculated in each pixel of the line CCD 41 and compared with a threshold value Vtha determined in advance.

$$\text{Norm\_data}\_a[N] = \text{Norm\_data}[N] - \text{Ref\_data}[N] \quad (1)$$

where Norm_data_a[N] is the absolute change amount in each pixel of the line CCD 41.

In this processing, the absolute change amount Norm_data_a[N] in each pixel of the line CCD 41 is only calculated and compared with the threshold value Vtha. Hence, no long processing time is necessary, and the presence/absence of input can be determined at a high speed. Especially, when the number of pixels whose change amounts are more than the threshold value Vtha exceeds a predetermined number, it is determined that input by the pointer is present.

A method will be described next with reference to FIG. 12 in which to more accurately detect input by the pointer, an input point is determined by calculating the pixel data change ratio.

Figure 12:
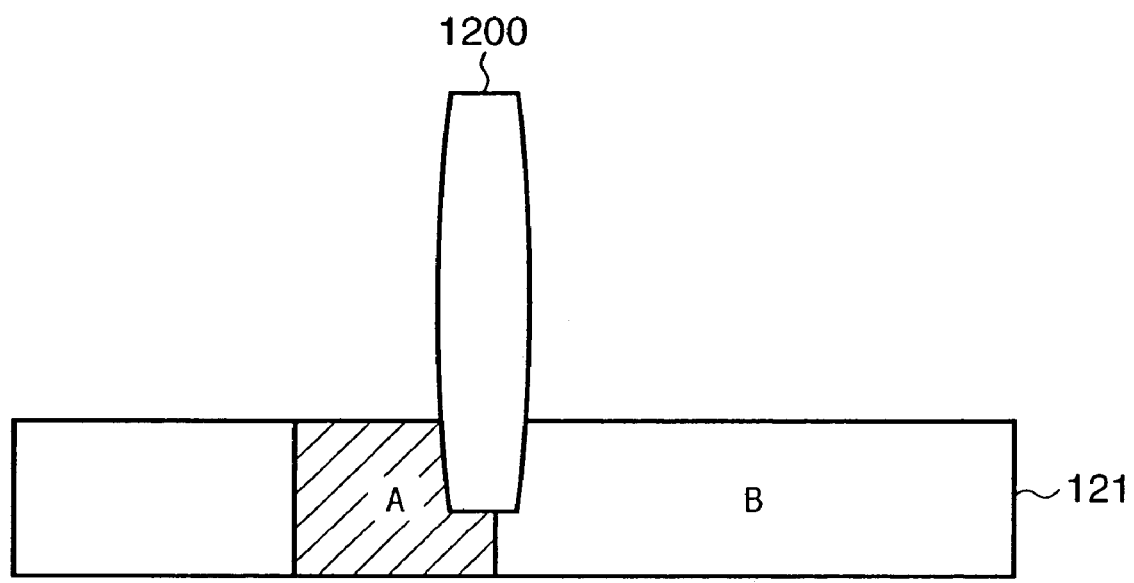
FIG. 12 is a view for explaining an input example of the first embodiment of the present invention.

Referring to FIG. 12, reference numeral 121 denote the retroreflecting surface of the retroreflecting member 3. Assume that the reflectance in a region A is low because of dirt or the like. As for the pixel data distribution (light amount distribution) of Ref_data[N] at this time, the reflected light amount is small at a portion corresponding to the region A, as indicated by 13-1 in FIG. 13. When a pointer 1200 is inserted and almost covers the upper half portion of the retroreflecting surface 121 in this state, as shown in FIG. 12, the reflected light amount is almost halved. Hence, Norm_data[N] indicated by the bold line in 13-2 in FIG. 13 is observed.

Figure 14:
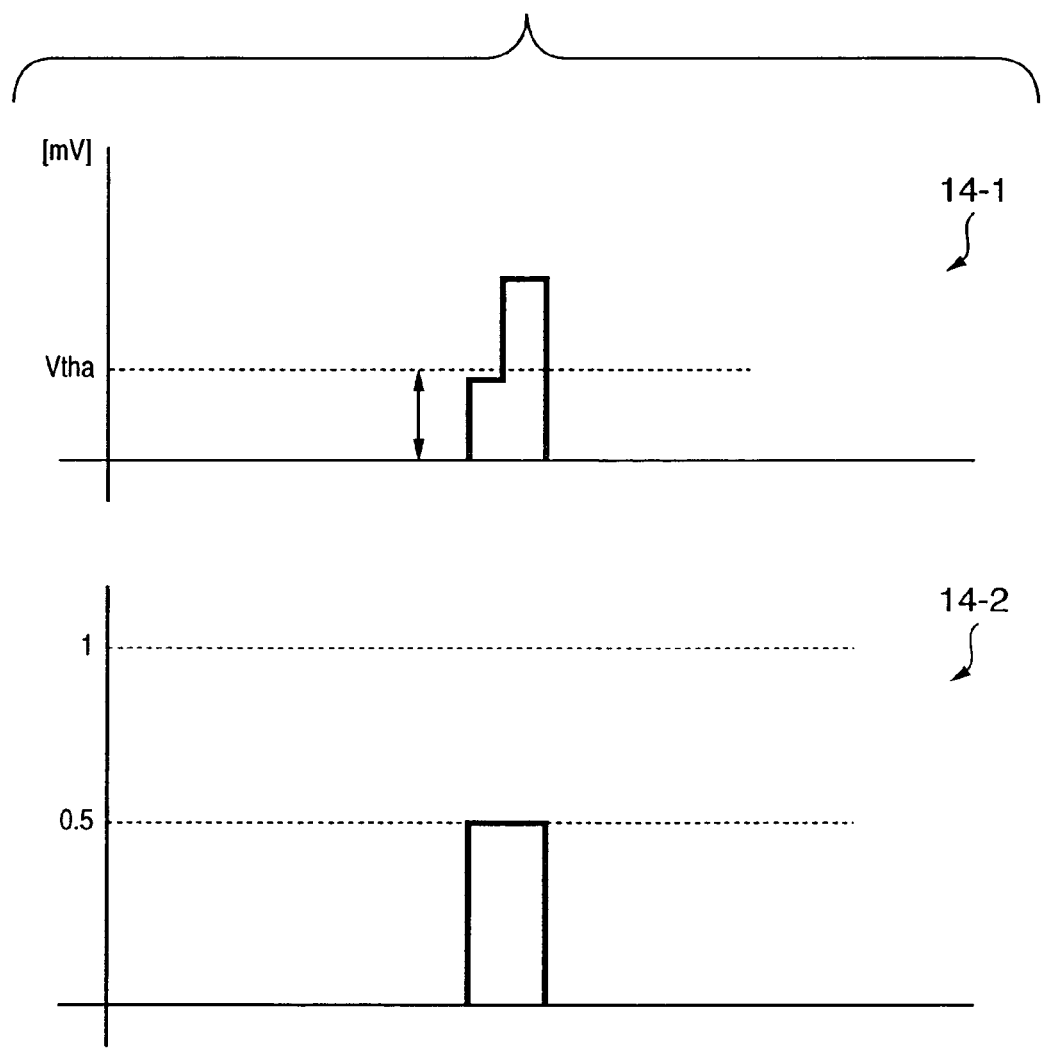
FIG. 14 is a graph for explaining the light amount change amount and light amount change ratio in the light amount distribution obtained by the sensor unit according to the first embodiment of the present invention.

When equation (1) is applied to this state, the pixel data distribution is indicated by 14-1 in FIG. 14. The ordinate represents the differential voltage from the initial state.

When the threshold value Vtha is applied to this pixel data, it may be impossible to detect the actual input range. When the threshold value Vtha is made small, the input range can be detected to some extent, though there may be the influence of noise.

To prevent this, the pixel data change ratio is calculated. In both the region A and a region B, the reflected light amount is ½ that in the initial state. Hence, the ratio can be calculated by $$\text{Norm\_data}\_r[N] = \text{Norm\_data}\_a[N] / (\text{Bas\_data}[N] - \text{Ref\_data}[N]) \quad (2)$$

From this calculation result, the change in pixel data is represented by a ratio, as in 14-2 in FIG. 14. Even when the reflectance of the retroreflecting member 3 changes, the same processing can be executed, and the input can accurately be detected.

A threshold value Vthr is applied to the pixel data. Pixel numbers corresponding to the leading edge and trailing edge of the pixel data distribution corresponding to the light-shielded range are acquired. A central point between the two pixels is defined as the pixel corresponding to the input by the pointer. Accordingly, the input position of the pointer can more accurately be determined.

The distribution 14-2 in FIG. 14 is a schematic illustration for a descriptive convenience. Such a leading edge cannot be obtained in fact, and the respective pixels exhibit different data levels.

Details of a detection result obtained by applying equation (2) to the pixel data will be described next with reference to FIG. 15.

Figure 15:
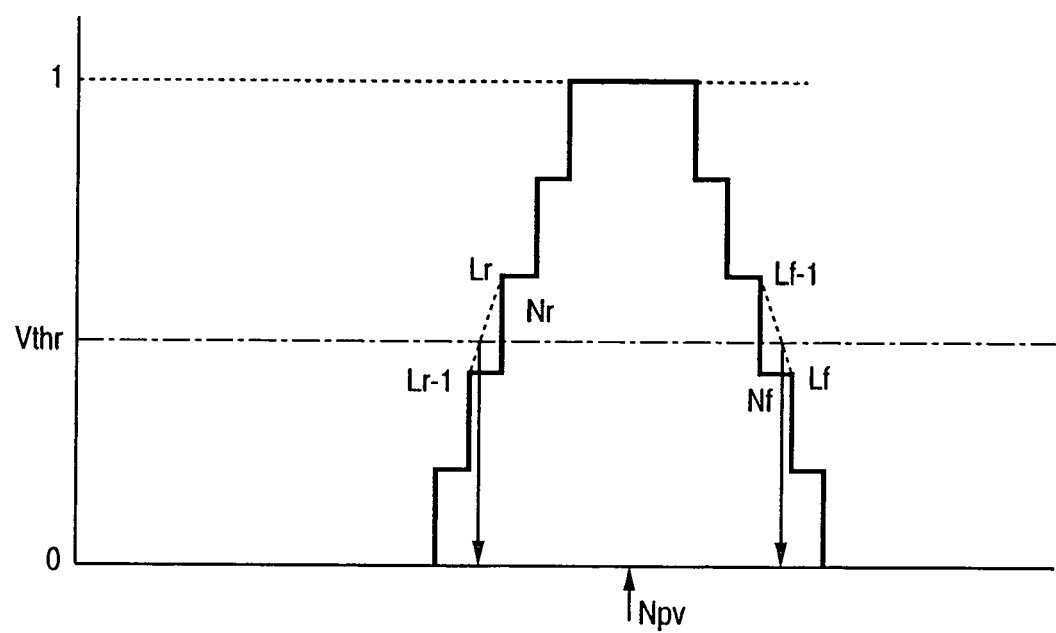
FIG. 15 is a graph showing a light-shielded range detection example of the first embodiment of the present invention.

FIG. 15 is a graph showing details of a detection result according to the first embodiment of the present invention.

Referring to FIG. 15, the threshold value Vthr is set to detect the light-shielded range by the pointer. The leading edge portion of the pixel data distribution that crosses the threshold value Vthr indicates the Nrth pixel. The trailing edge portion indicates the Nfth pixel. At this time, a central pixel Np between the pixels is given by $$Np = Nr + (Nf - Nr)/2 \quad (3)$$

In this calculation, however, the pixel interval corresponds to the minimum resolution.

To more finely detect the light-shielded range, virtual pixel numbers which cross the threshold value Vthr are calculated by using the data level of each pixel and that of an immediately preceding adjacent pixel.

Let Lr be the data level of the Nrth pixel, Lr−1 be the data level of the (Nr−1)th pixel, Lf be the data level of the Nfth pixel, and Lf−1 be the data level of the (Nf−1)th pixel. Virtual pixel numbers Nrv and Nfv are given by $$Nrv = Nr - 1 + (Vthr - Lr - 1)/(Lr - Lr - 1) \quad (4)$$

$$Nfv = Nf - 1 + (Vthr - Lf - 1)/(Lf - Lf - 1) \quad (5)$$

A virtual central pixel Npv between the virtual pixel numbers Nrv and Nfv is given by $$Npv = Nrv + (Nfv - Nrv)/2 \quad (6)$$

As described above, when virtual pixel numbers which cross the threshold value Vthr are calculated on the basis of the pixel numbers of pixels having data levels more than the threshold value Vthr, adjacent pixel numbers, and their data levels, detection with a higher resolution can be implemented.

<Detection in Direct Reflection>

Pointer angle detection for the sensor unit when direct reflected light from the pointer is not present has been described above. When the surface reflectance of the pointer is high, not reflected light from the retroreflecting surface of the retroreflecting member 3 but direct reflected light of light from the light projecting unit 30 may be generated on the surface of the pointer 1200, as shown in FIG. 16. This reflected light may be detected by the sensor unit 1L or 1R.

Figure 17:
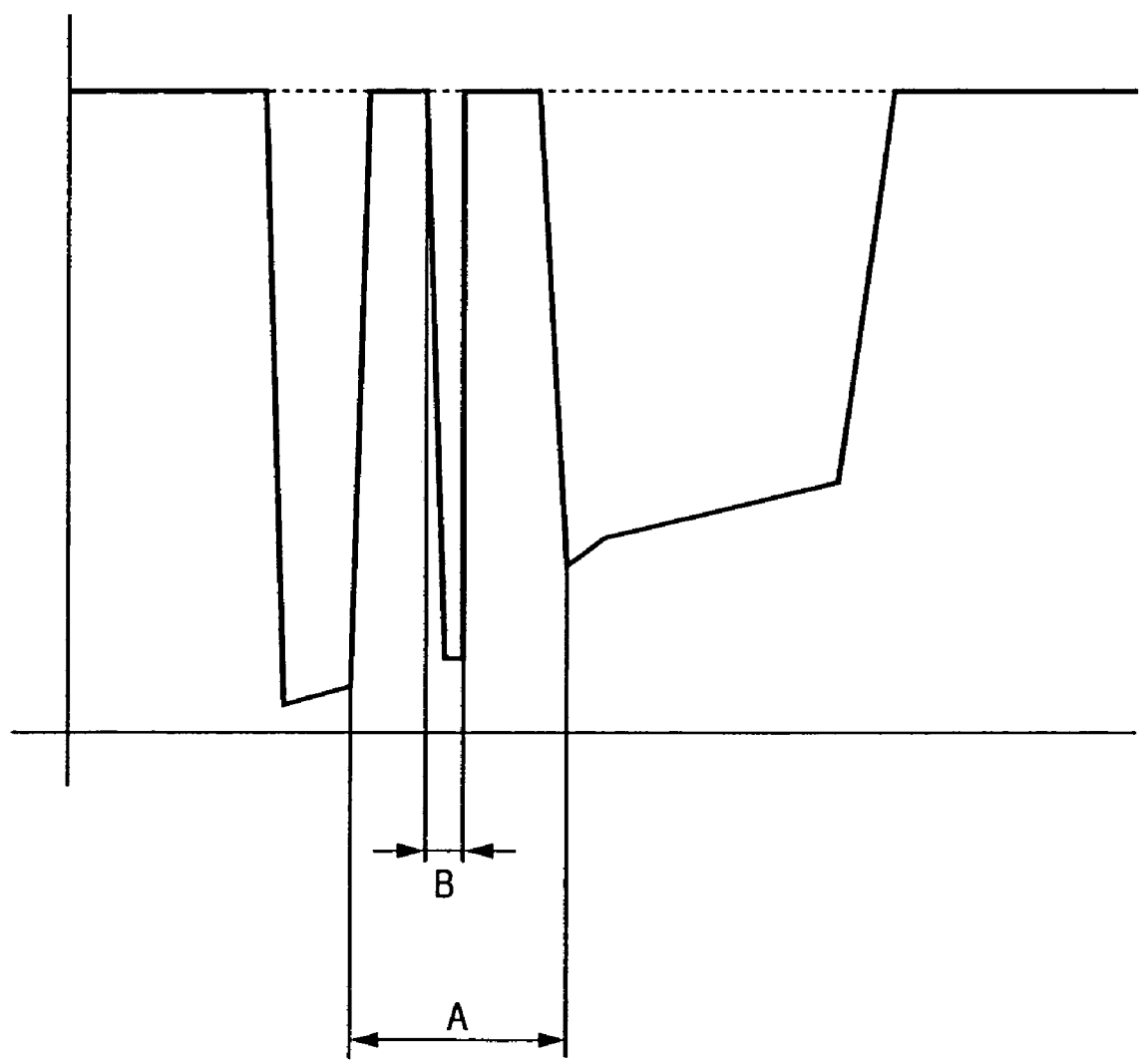
FIG. 17 is a graph showing an example of a light amount distribution obtained by the sensor unit when direct reflection from the pointer according to the first embodiment of the present invention exists.

For example, referring to FIG. 17, the original light-shielded range is the region A. However, the reflected light (direct reflected light) from the surface of the pointer forms the portion B so that detection is done as if input were done in two ranges.

Figure 18:
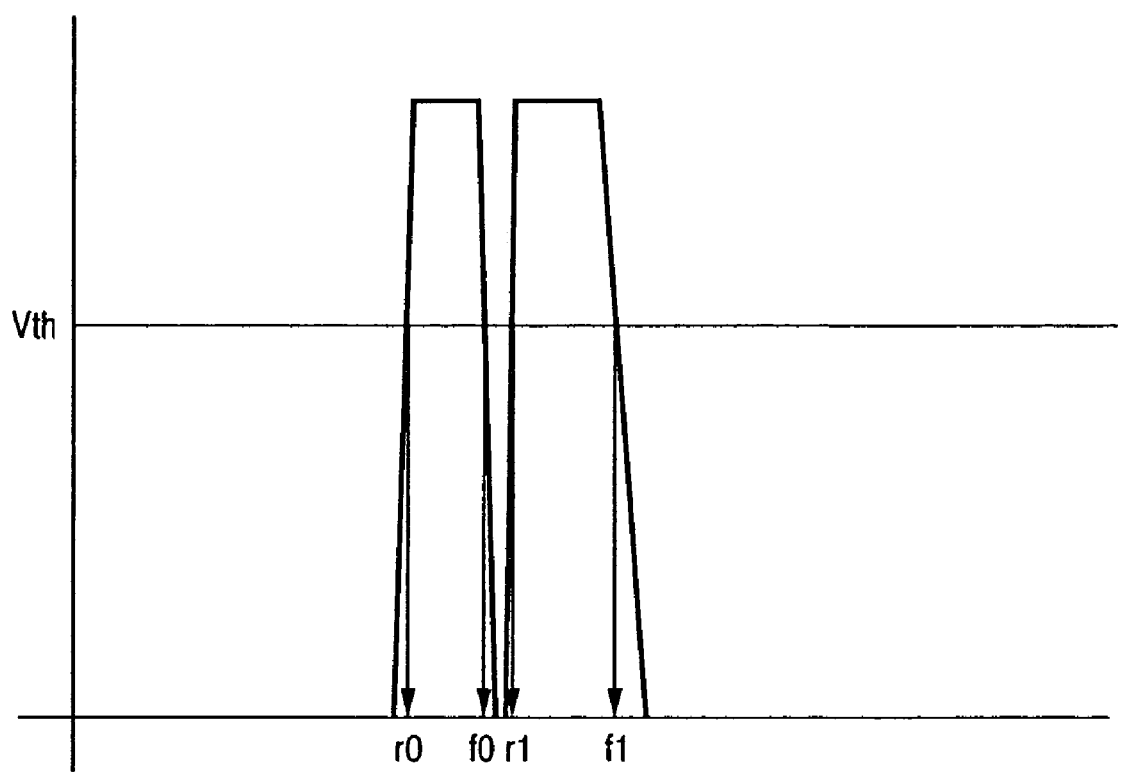
FIG. 18 is a graph for explaining detection of a plurality of leading and trailing edges in the light amount distribution according to the first embodiment of the present invention.

In this case, when the pixel data change ratio is calculated by using equation (2), the light amount distribution shown in FIG. 17 changes to that shown in FIG. 18.

Referring to FIG. 18, when points that cross a threshold value Vth are detected, r0 and r1 can be detected as the leading edges of the pixel data distribution, and f0 and f1 can be detected as trailing edges.

The section between f0 and r1 is generated by direct reflected light by the pointer. The light-shielded range by original input is the range between r0 and f1. Normally, when the pointer is cylindrical, the light amount distribution of direct reflected light appears almost at the center of the light-shielded range, though it changes depending on the shape of the pointer. For this reason, when the intermediate point between f0 and f1 representing the light amount distribution of the direct reflected light is set as the input position (detection angle) of the pointer, accurate detection can be performed.

Feature point detection processing will be described below with reference to FIG. 19, in which to detect the pixel data distribution (light amount distribution) corresponding to the direct reflected light from the pointer, the feature point (leading and trailing edge points in the direct reflected light above the threshold value) in the pixel data distribution obtained from the line CCD 41 is detected.

Figure 19:
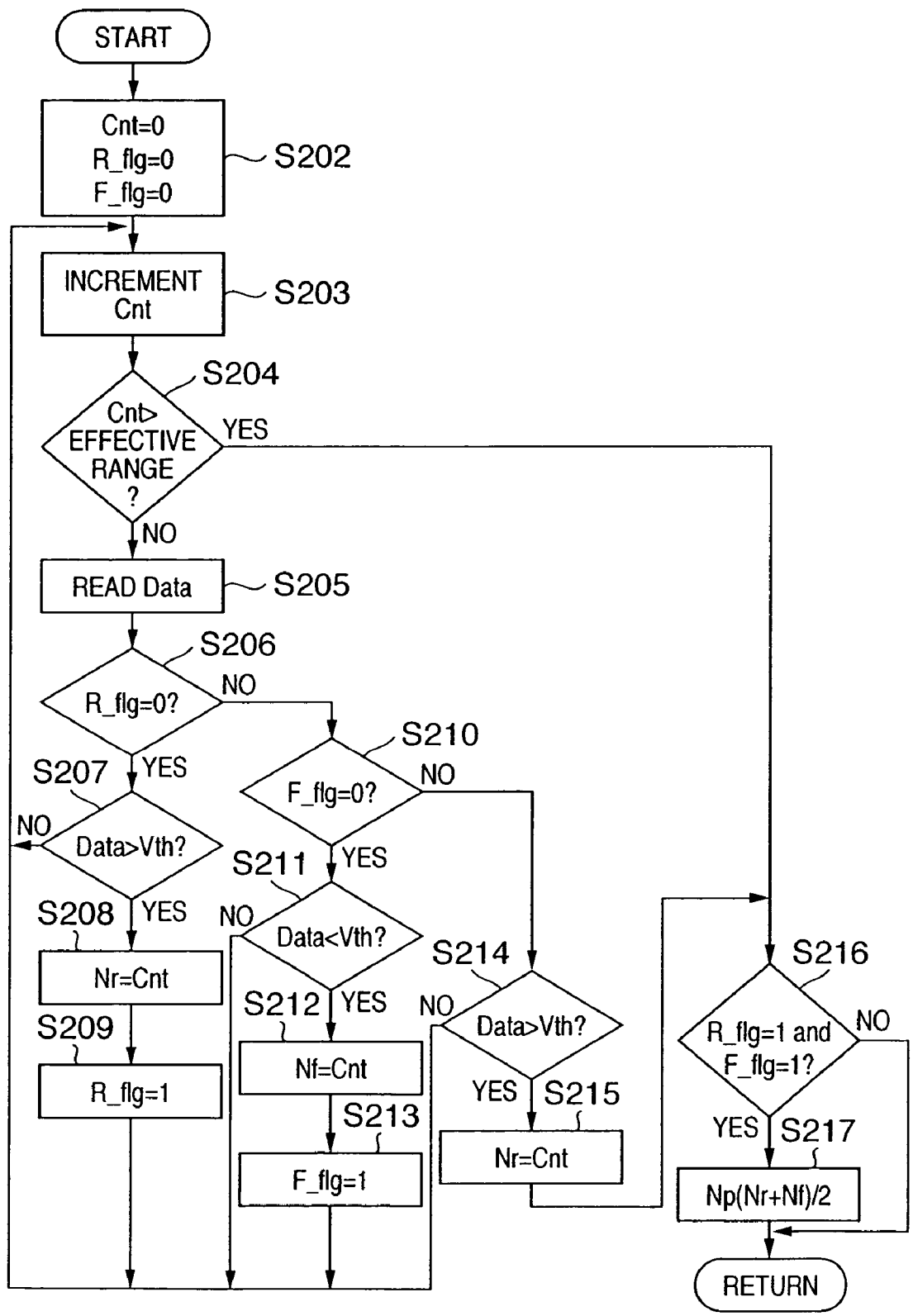
FIG. 19 is a flowchart showing feature point detection processing according to the first embodiment of the present invention.

FIG. 19 is a flowchart showing feature point detection processing according to the first embodiment of the present invention.

First, the feature point detection processing is invoked as the subroutine of coordinate calculation processing shown in FIG. 22 (to be described later).

In step S202, a counter Cnt which indicates the pixel number of a pixel included in the line CCD 41 of the detection unit 40 of the sensor unit 1L (1R), a leading edge detection flag R_flg (0: leading edge undetected state, and 1: leading edge detected state) which indicates the detection state of the leading edge point of the pixel data distribution above the threshold value Vth, and trailing edge detection flag F_flg (0: trailing edge undetected state, and 1: trailing edge detected state) which indicates the detection state of the trailing edge point of the pixel data distribution above the threshold value Vth are initialized.

In step S203, the counter Cnt is incremented.

In step S204, it is determined whether the pixel number indicated by the value of the counter Cnt falls outside the effective detection range of the line CCD 41. If the pixel number falls outside the effective range (YES in step S204), the flow advances to step S216. On the other hand, if the pixel number falls within the effective range (NO in step S204), the flow advances to step S205 to load the pixel data (Data) of the pixel number indicated by the value of the counter Cnt.

Next, it is determined whether the leading edge detection flag R_flg=0. If the leading edge detection flag R_flg=0 (YES in step S206), the flow advances to step S207 to determine whether the pixel data (Data) is equal to or larger than the threshold value Vth.

If the pixel data (Data) is smaller than the threshold value Vth (NO in step S207), the flow returns to step S203 to increment the counter Cnt. If the pixel number indicated by the value of the counter Cnt falls within the effective range, the pixel data (Data) of the next pixel number indicated by the value of the counter Cnt is loaded as a processing target in step S205, and the same processing as described above is executed. On the other hand, if the pixel data (Data) is equal to or larger than the threshold value Vth (YES in step S207), the flow advances to step S208.

In step S208, the pixel data (Data) of the pixel number indicated by the current value of the counter Cnt is stored in the memory 82 as the leading edge data Nr of the pixel data distribution corresponding to the light-shielded range. In step S209, the leading edge detection flag R_flg=1 is set.

From this point, when the counter Cnt is incremented in step S203, the pixel data (Data) of the pixel number indicated by the value of the counter Cnt is loaded, and the determination in step S206 is done, the flow advances from step S206 to step S210 because the leading edge detection flag R_flg=1.

In step S210, it is determined whether the trailing edge detection flag F_flg=0. If the trailing edge detection flag F_flg=0 (YES in step S210), the flow advances to step S211 to determine whether the pixel data (Data) is smaller than the threshold value Vth. If the pixel data (Data) is equal to or larger than the threshold value Vth (NO in step S211), the flow returns to step S203.

If the pixel data (Data) is smaller than the threshold value Vth (YES in step S211), the flow advances to step S212 to store the pixel data (Data) of the pixel number indicated by the current value of the counter Cnt in the memory 82 as the trailing edge data Nf of the pixel data distribution corresponding to the direct reflected light. In step S213, the trailing edge detection flag F_flg=1 is set.

From this point, when the counter Cnt is incremented in step S203, the pixel data (Data) of the pixel number indicated by the value of the counter Cnt is loaded, and the determination in step S210 is done, the flow advances from step S210 to step S214 because the trailing edge detection flag F_flg=1.

In step S214, it is determined whether the pixel data (Data) is equal to or larger than the threshold value Vth.

When no direct reflected light is present, or the data level corresponding to the direct reflected light is less than the threshold value Vth, the pixel data (Data) will no longer exceed the threshold value Vth. For this reason, even when the pixel data (Data) is loaded up to the end of the effective range of the line CCD 41, the value of the trailing edge data Nf does not change. However, when direct reflected light is being detected, the pixel data (Data) exceeds the threshold value Vth again.

If the pixel data (Data) is equal to or larger than the threshold value Vth (YES in step S214), the flow advances to step S215 to store the pixel data (Data) of the pixel number indicated by the current value of the counter Cnt in the memory 82 as the leading edge data Nr of the pixel data distribution corresponding to the direct reflected light. Accordingly, the leading edge data Nr precedingly stored in the memory 82 is overwritten.

When the processing for the pixel data (Data) within the effective range is ended, the leading edge detection flag R_flg and trailing edge detection flag F_flg are checked.

More specifically, it is determined in step S216 whether the leading edge detection flag R_flg=1, and the trailing edge detection flag F_flg=1. If the conditions in the determination in step S216 are satisfied (YES in step S216), the flow advances to step S217 to calculate the intermediate point Np (=(Nr+Nf)/2: central pixel number) of the pixel data distribution corresponding to the direct reflected light from the leading edge data Nr and trailing edge data Nf stored in the memory 82, and the flow returns.

On the other hand, if the conditions in the determination in step S216 are not satisfied (NO in step S216), it is determined that input by the pointer is not present, a flag representing it is set, and the flow returns.

In FIG. 19, detection of the leading and trailing edges of the pixel data distribution corresponding to the direct reflected light is executed by using the pixel numbers of actual pixels of the line CCD 41. To increase the accuracy, virtual pixel numbers using equations (4), (5), and (6) described above may be used.

As described above, even when direct reflected light from the pointer is generated, and a plurality of leading and trailing edge points which cross the threshold value in the pixel data distribution as the light-shielded range candidates are detected, the central point of the pixel data distribution obtained from the trailing edge point (first trailing edge point) f0 detected next to the leading edge point detected first and the leading edge point (second leading edge point) r1 detected next to the trailing edge point is detected as the central point (central pixel number) corresponding to the light amount distribution of the direct reflected light. Accordingly, accurate detection considering the influence of the direct reflected light from the pointer can be executed.

To calculate the actual coordinate values of the pointer from the central pixel number representing the central point of the light-shielded range obtained by the processing shown in FIG. 19, the central pixel number must be converted into angle information.

In actual coordinate calculation processing to be described later, it is more convenient to obtain the value of tangent at that angle than the angle itself.

The pixel number is converted into Tan θ by looking up a table or using transformation. Especially, when the optical system in the detection unit 40 has no aberration, linear transformation can be used. If aberration is present, the error of aberration can be removed by using a polynomial of higher degree.

The relationship between a pixel number and Tan θ will be described with reference to FIG. 20.

Figure 20:
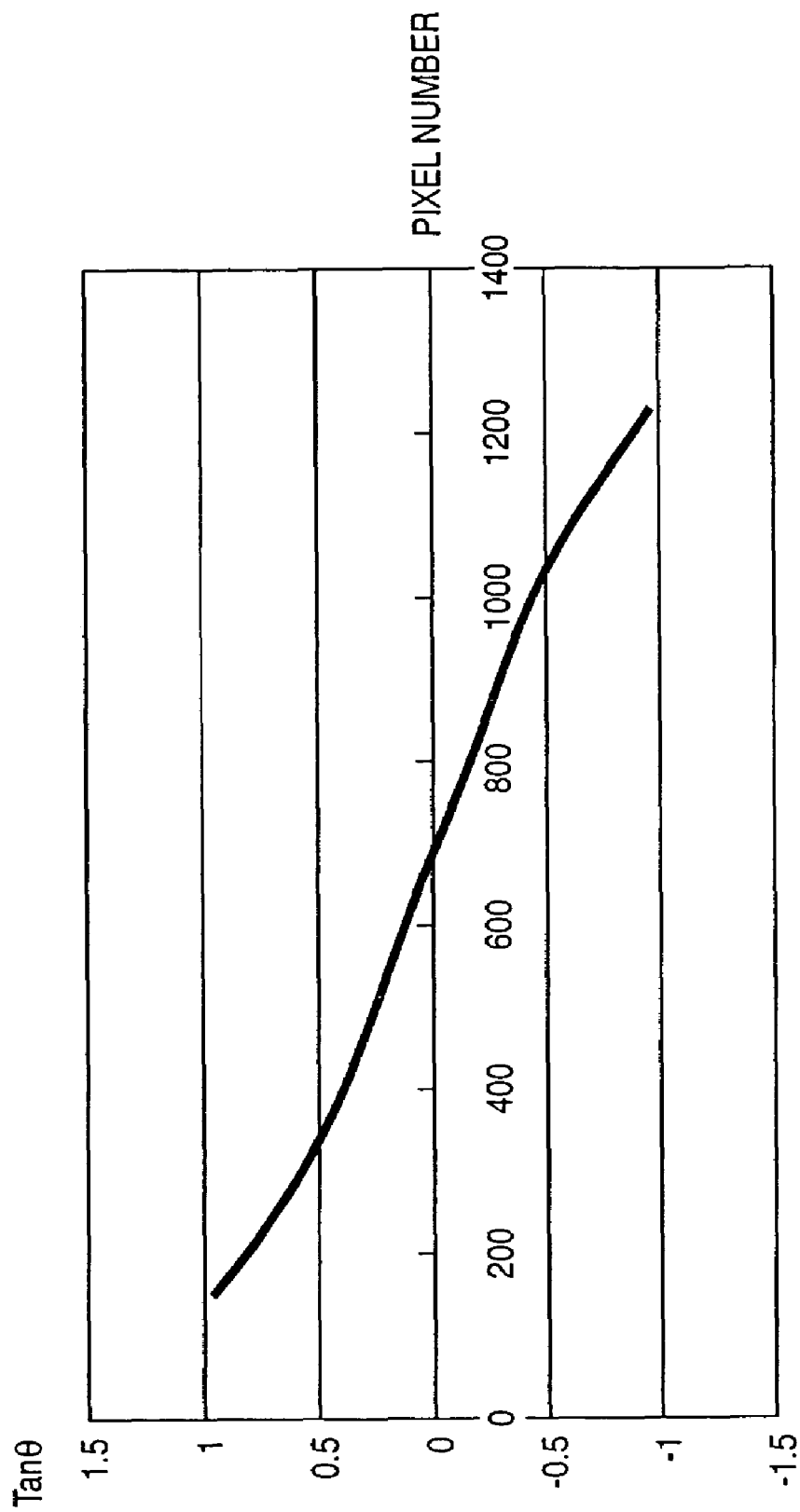
FIG. 20 is a graph showing the relationship between a value Tan θ and a pixel number in the first embodiment of the present invention.

FIG. 20 is a graph showing the relationship between a value Tan θ and a pixel number in the first embodiment of the present invention.

On the basis of FIG. 20, an approximate expression to obtain Tan θ from a pixel number is defined. A pixel number can be converted into Tan θ by using the approximate expression (transformation).

As the transformation, a polynomial of higher degree is used, the accuracy can be ensured. The degree of the polynomial is determined in consideration of the calculation capability and accuracy specifications of the coordinate input apparatus.

For, e.g., a quintic polynomial, six coefficients are necessary. The coefficient data are stored in the memory 82 at the time of shipment.

Letting L5, L4, L3, L2, L1, and L0 be the coefficients of the quintic polynomial, Tan θ is given by $$\text{Tan } \theta = (L5*Npr+L4)*Npr+L3)*Npr+L2)*Npr+L1)*Npr+L0 \quad (7)$$

When this calculation is executed for each pixel number detected by the line CCD 41 in the detection unit 40 of each of the sensor units 1L and 1R, corresponding angle data (Tan θ) can be determined. In the above example, Tan θ is obtained directly from the pixel number. Instead, the angle itself may be obtained from the pixel number first, and then, Tan θ may be obtained.

<Description of Coordinate Calculation Method>

The position coordinates of the pointer are calculated from the angle data (Tan θ) converted from the pixel number.

The positional relationship between the sensor units 1L and 1R and coordinates defined on the coordinate input region 4 will be described with reference to FIG. 21.

Figure 21:
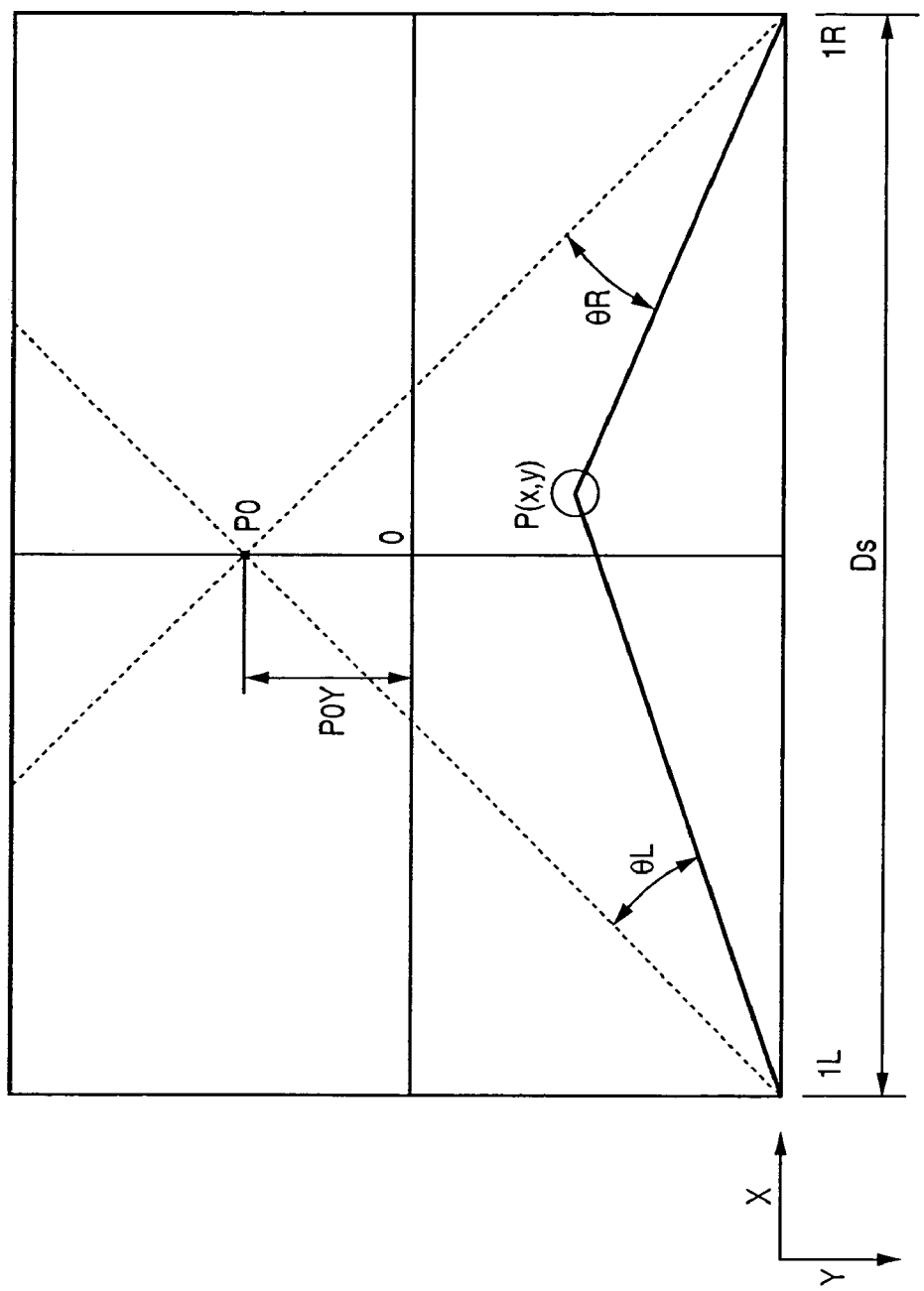
FIG. 21 is a view showing the positional relationship between the sensor units 1L and 1R and coordinates defined on the coordinate input region in the first embodiment of the present invention.

FIG. 21 is a view showing the positional relationship between the sensor units 1L and 1R and coordinates defined on the coordinate input region in the first embodiment of the present invention.

Referring to FIG. 21, the sensor units 1L and 1R are attached to the left and right of the lower side of the coordinate input range of the coordinate input region 4. The distance between the sensor units is represented by Ds.

The origin position is defined at the center of the coordinate input region 4. P0 is an intersection for the sensor units 1L and 1R at an angle of 0°.

Letting θL and θR be angles of the sensor units 1L and 1R, Tan θL and Tan θR are calculated by using equation (7).

At this time, the coordinates P(x,y) are given by $$x = Ds/2*(\text{Tan } \theta L + \text{Tan } \theta R)/(1+(\text{Tan } \theta L*\text{Tan } \theta R)) \quad (8)$$

$$y = -Ds/2*(\text{Tan } \theta R - \text{Tan } \theta L - (2*\text{Tan } \theta L*\text{Tan } \theta R))/(1+(\text{Tan } \theta L*\text{Tan } \theta R)) + P0Y \quad (9)$$

The coordinate calculation processing of the coordinate input apparatus based on the above calculation will be described with reference to FIG. 22.

Figure 22:
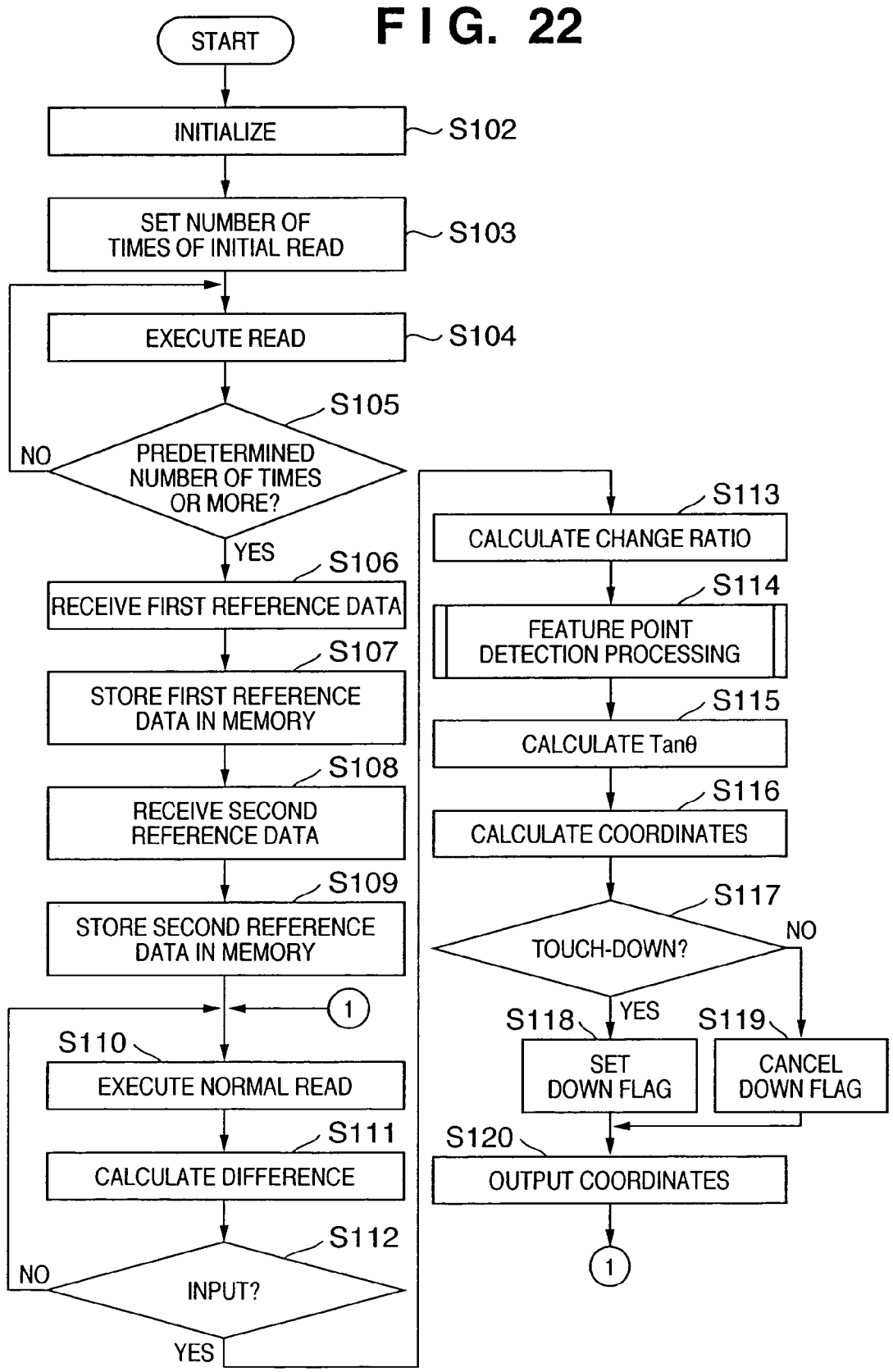
FIG. 22 is a flowchart showing coordinate calculation processing executed by the coordinate input apparatus according to the first embodiment of the present invention.

FIG. 22 is a flowchart showing coordinate calculation processing executed by the coordinate input apparatus according to the first embodiment of the present invention.

When the coordinate input apparatus is powered on, various kinds of initialization operations related to the coordinate input apparatus are executed in step S102, including port setting of the control/arithmetic unit 2 and timer setting.

In step S103, the number of times of initial read for the initial read operation of the line CCD 41 is set.

The initial read operation is an operation to remove unnecessary charges of the line CCD 41 at the time of activation of the coordinate input apparatus. The line CCD 41 sometimes accumulate unnecessary charges in an inoperative state. If the coordinate input operation is executed without removing the charges, detection may be impossible, or a detection error occurs. To avoid this, in step S103, in a state wherein light projection by the light projecting unit 30 is stopped, the read operation is executed a predetermined number of times, thereby removing unnecessary charges.

In step S104, the read operation of the line CCD 41 is executed. In step S105, it is determined whether the read is executed a predetermined number of times or more. If the read is not executed a predetermined number of times or more (NO in step S105), the flow returns to step S104. When the read is executed a predetermined number of times or more (YES in step S105), the flow advances to step S106.

In step S106, the pixel data (Bas_data[N]) of the line CCD 41 in the state wherein light projection by the light projecting unit 30 is stopped is received as first reference data. In step S107, the first reference data is stored in the memory 82.

In step S108, the pixel data (Ref_data[N]) of the line CCD 41 in the state wherein light projection by the light projecting unit 30 is executed is received as second reference data. In step S109, the second reference data is stored in the memory 82.

The above processing is the initial operation at the time of power-on. An operation for the input by the pointer is executed subsequently.

In step S110, in the coordinate input sampling state, the normal read operation of the line CCD 41 is executed to receive pixel data (Norm_data[N]). In step S111, the difference value between the second reference data (Ref_data[N]) and the pixel data (Norm_data[N]) is calculated. In step S112, the presence/absence of input by the pointer is determined on the basis of the difference value. If no input is detected (NO in step S112), the flow returns to step S110. If input is detected (YES in step S112), the flow advances to step S113.

When the repetitive period at this time is set to about 10 [msec], sampling is executed at 100 times/sec.

In step S113, the pixel data change ratio is calculated by using equation (2). In step S114, the above-described feature point detection processing shown in FIG. 19 is executed to determine the central pixel number as the center of the light amount distribution corresponding to the direct reflected light. In step S115, Tan θ is calculated from the determined central pixel number and equation (7).

In step S116, the input coordinates P(x,y) of the pointer are calculated by using equations (8) and (9) from the value Tan θ for the sensor units 1L and 1R.

In step S117, it is determined whether the input by the pointer is touch-down input.

For example, when the proximity input state corresponding to a state wherein the cursor is moved without clicking on the button of the mouse and a touch-down state corresponding to a state wherein the left button of the mouse is clicked on are set as the input functions by the pointer, the input state by the pointer is determined.

For the two input states, for example, when the maximum value of the pixel data change ratio calculated in step S113 is equal to or larger than a predetermined value (e.g., 0.5), the touch-down state is determined. If the maximum value is smaller than the predetermined value, the proximity state is determined. Alternatively, when a dedicated pointer or the like is used, not the pixel data but another means may be used. For example, a switch or the like is arranged on the pointer, and the state of the switch is transmitted/received by using a radio wave or light to determine the touch-down state or the like.

On the basis of this determination method, if it is determined in step S117 that the input by the pointer is touch-down input (YES in step S117), the flow advances to step S118 to set a down flag representing the touch-down input. On the other hand, if the input by the pointer is not touch-down input (NO in step S117), the flow advances to step S119 to cancel the down flag.

In step S120, the down flag state and the calculated coordinate values are output to an external terminal. In the external terminal, for example, cursor movement or a change of the mouse button state is done on the basis of the received coordinate values and down flag state.

When the processing in step S120 is ended, the flow returns to step S110. The above processing is repeated until power-off.

As described above, according to the first embodiment, even when direct reflected light from the pointer is received by the sensor units 1L and 1R without intervening the retroreflecting member 3, the coordinates can accurately be detected in consideration of the direct reflected light.

That is, in the first embodiment, even when direct reflected light from the pointer is generated, and a plurality of leading and trailing edge points which cross the threshold value in the pixel data distribution as the light-shielded range candidates are detected, the central point of the pixel data distribution obtained from the trailing edge point (first trailing edge point) f0 detected next to the leading edge point detected first and the leading edge point (second leading edge point) r1 detected next to the trailing edge point is detected as the central point (central pixel number) corresponding to the light amount distribution of the direct reflected light. Accordingly, accurate detection considering the influence of the direct reflected light from the pointer can be executed.

Second Embodiment

In the first embodiment, to take the influence of direct reflected light from an unspecified pointer into consideration, a plurality of leading and trailing edge points which cross the threshold value in the pixel data distribution as the light-shielded range candidates by the pointer, which are obtained from the sensor units 1L and 1R, are detected. Of the leading and trailing edge points, the central point of the pixel data distribution obtained from the trailing edge point (first trailing edge point) detected next to the leading edge point detected first and the leading edge point (second leading edge point) detected next to the trailing edge point is defined as the central point (central pixel number) corresponding to the direct reflected light, i.e., the input point of the pointer. On the basis of it, the angle of the pointer with respect to the sensor unit 1L or 1R is calculated.

However, when the pointer is input at a short distance position of a sensor unit 1L or 1R, or the reflectance of the pointer is very high, light may be input beyond the light-receiving allowable range (dynamic range) of the sensor unit 1L or 1R.

Figure 23:
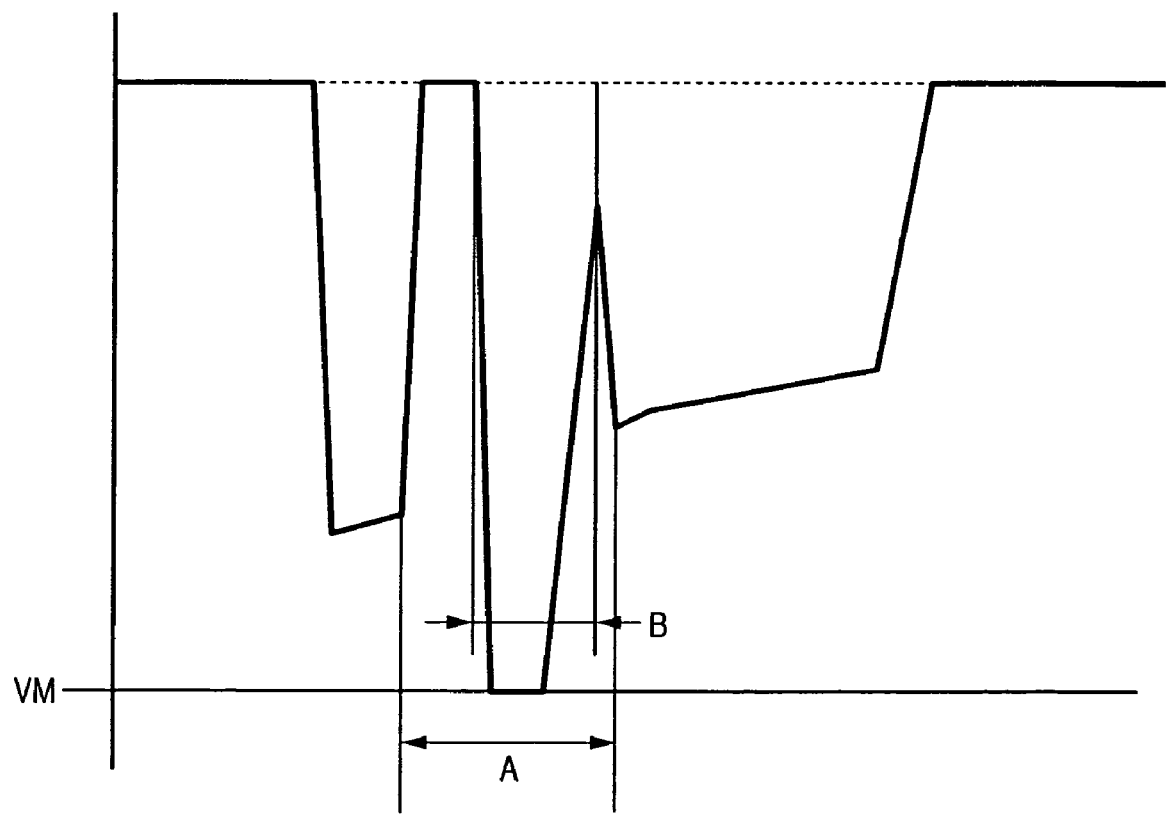
FIG. 23 is a graph showing an example of a light amount distribution obtained by the sensor unit when direct reflection from a pointer according to the second embodiment of the present invention exists.

In such a case, the sensor unit 1L or 1R detects a light amount distribution as shown in FIG. 23. FIG. 23 shows a state in which a line CCD 41 in the sensor unit is saturated by direct reflected light, and the saturated line CCD 41 cannot output a correct light amount distribution. VM represents the maximum value of the light-receiving allowable range (dynamic range) of the sensor unit 1L or 1R. When such a state is generated, regions A and B shown in FIG. 23 cannot be specified.

Figure 24:
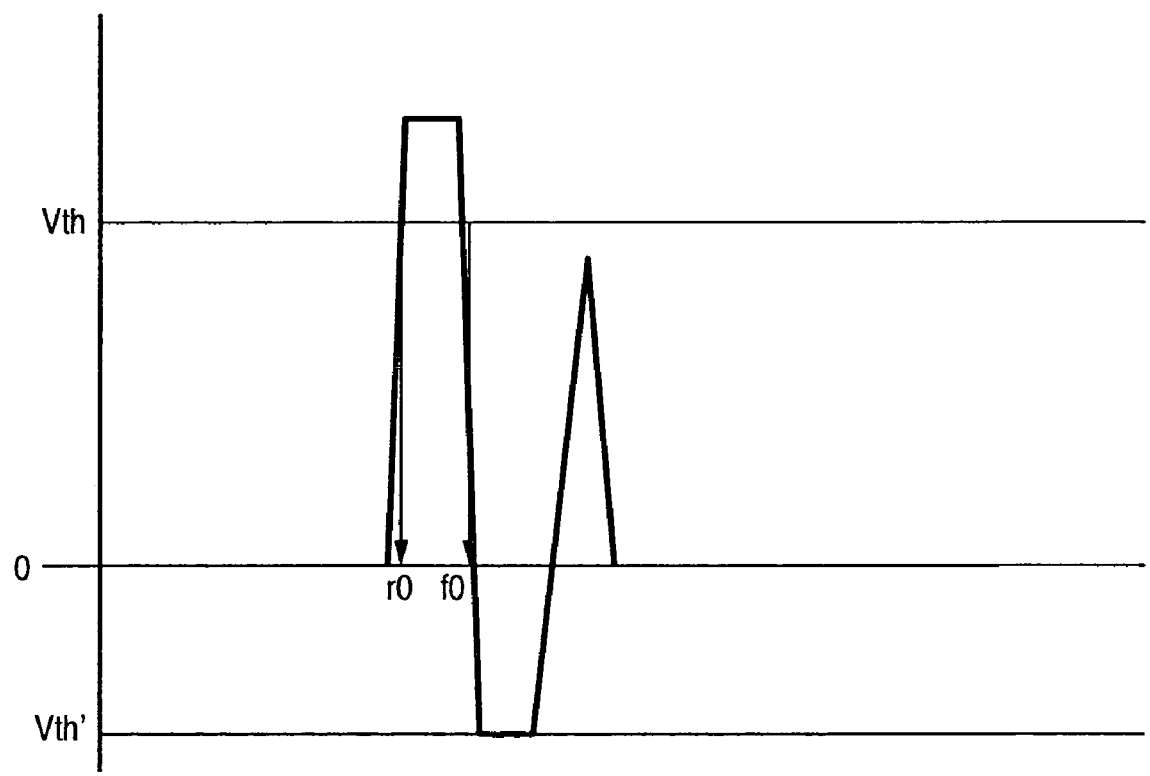
FIG. 24 is a graph for explaining a light amount change in the light amount distribution obtained by the sensor unit when direct reflection from the pointer according to the second embodiment of the present invention exists.

When the pixel data change ratio in FIG. 23 is calculated by using equation (2), the light amount distribution shown in FIG. 23 changes to that shown in FIG. 24.

Referring to FIG. 24, the light amount exceeds a threshold value Vth only at a leading edge point r0 of the light-shielded range and a trailing edge point f0 of the direct reflected light. With the feature point detection processing shown in FIG. 19 of the first embodiment, no correct feature point can be detected. Hence, the coordinate calculation accuracy becomes low.

To solve this problem, in the second embodiment, the light amount of an infrared LED 31 of a light projecting unit 30 is made smaller than the normal light amount such that the light amount distribution corresponding to the direct reflected light from the pointer falls within the dynamic range of the line CCD 41. Accordingly, even when direct reflected light is generated, a light amount distribution which falls within the dynamic range of the line CCD 41 can be ensured, and correct feature point detection can be implemented.

As a condition that decreases the light amount of the infrared LED 31, for example, a threshold value Vth' (FIG. 24) indicating the saturation level of the line CCD 41 is set. The processing is executed when the level of pixel data is less than the threshold value Vth'.

The method of decreasing the light amount of the infrared LED 31 is implemented by causing an arithmetic control circuit 83 to execute control stepwise to shorten the lighting time by a predetermined time or shorten the shutter open time (light reception time) of the line CCD 41 by a predetermined time.

Figure 25:
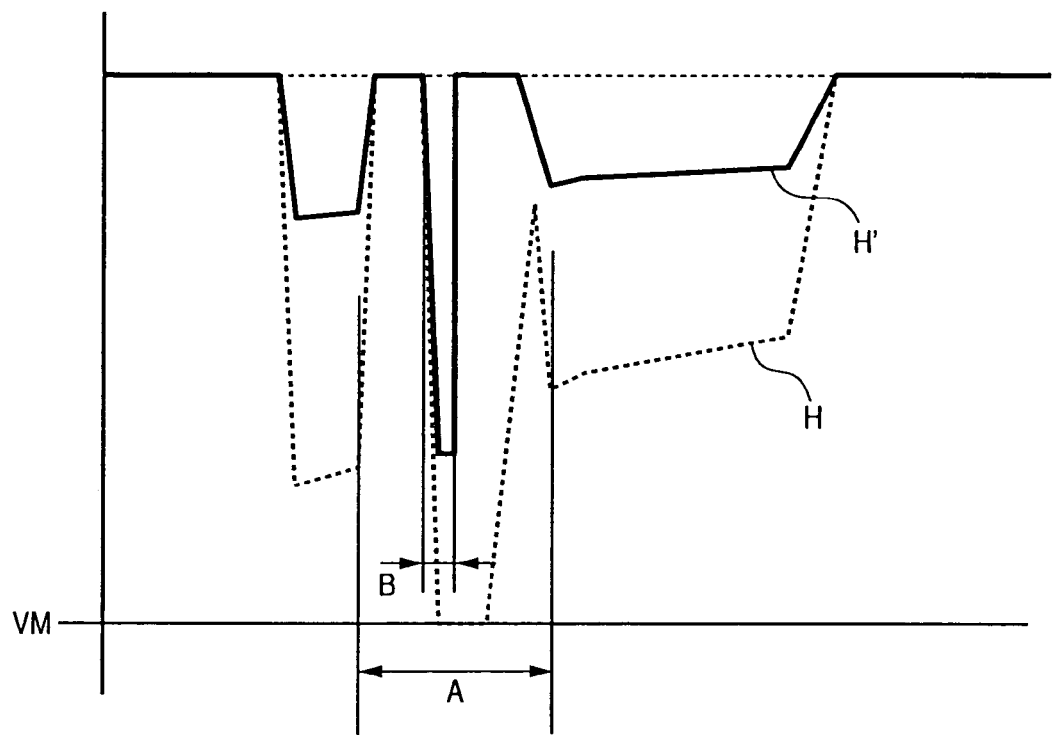
FIG. 25 is a graph showing an example of a light amount distribution obtained by the sensor unit when the light amount of an infrared LED according to the second embodiment of the present invention is decreased.

When such control is executed, the light amount distribution shown in FIG. 23 changes to, e.g., that shown in FIG. 25.

Referring to FIG. 25, the light amount distribution after the light amount of the infrared LED 31 is decreased is indicated by a solid line H'. A dotted line H indicates the light amount distribution (FIG. 23) when the line CCD 41 is saturated before the decrease in light amount.

As is apparent from FIG. 25, when the light amount of the infrared LED 31 is decreased, the region B as the light amount distribution corresponding to the direct reflected light is correctly output.

Figure 26:
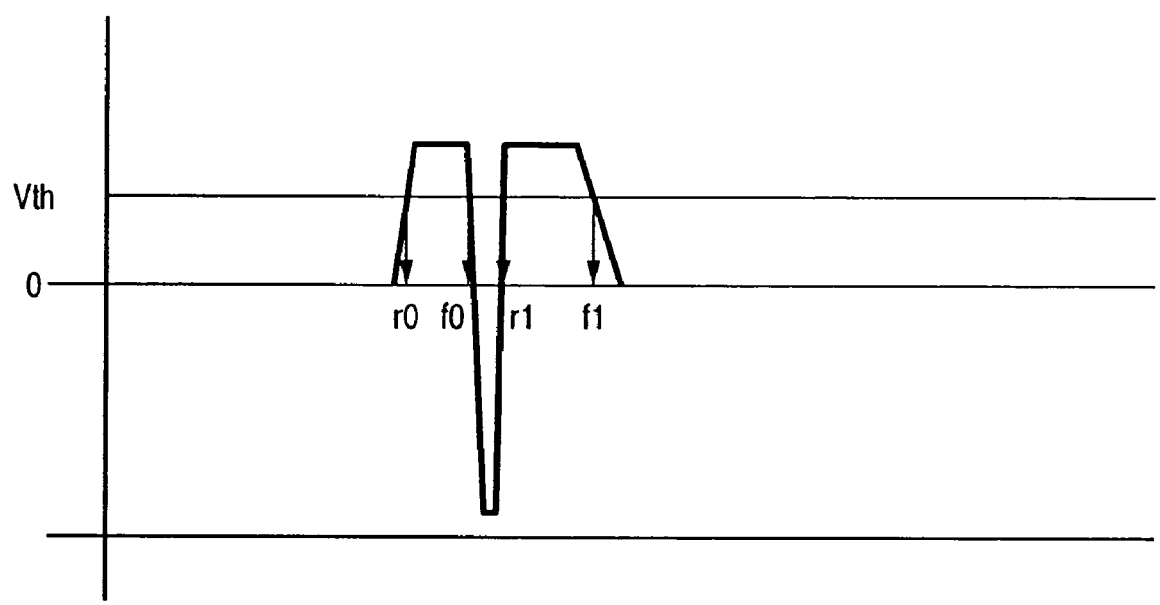
FIG. 26 is a graph for explaining a light amount change in the light amount distribution obtained by the sensor unit when the light amount of the infrared LED according to the second embodiment of the present invention is decreased.

When the pixel data change ratio for FIG. 25 is calculated by using equation (2), the light amount distribution shown in FIG. 25 changes to that shown in FIG. 26.

As shown in FIG. 26, in this case, the leading edge point r0 and a trailing edge point f1 of the light-shielded range and the trailing edge point f0 and a leading edge point r1 of the light amount distribution corresponding to the direct reflected light are correctly detected.

Feature point detection processing according to the second embodiment will be described below with reference to FIG. 27.

Figure 27:
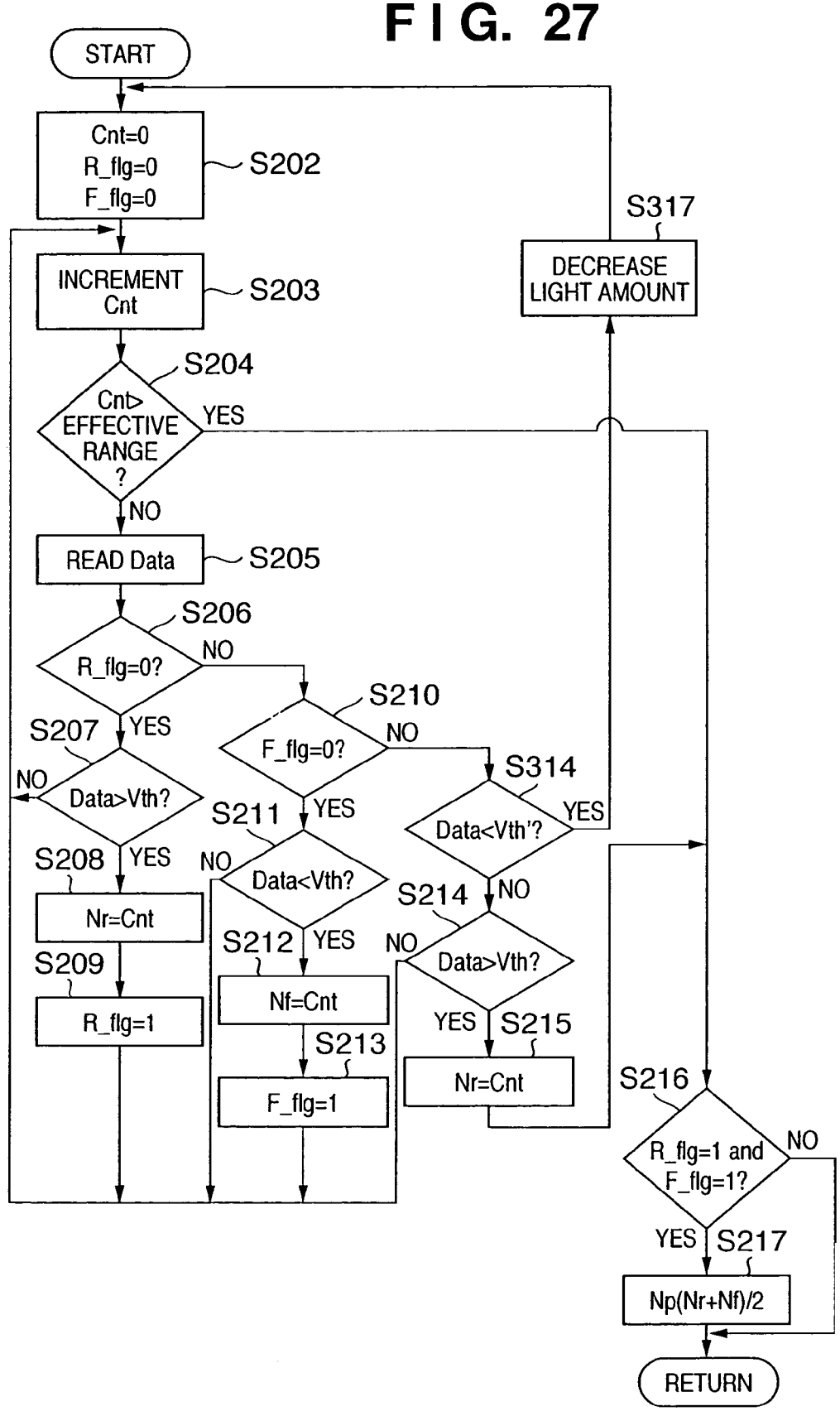
FIG. 27 is a flowchart showing feature point detection processing according to the second embodiment of the present invention.

FIG. 27 is a flowchart showing feature point detection processing according to the second embodiment of the present invention.

The flowchart shown in FIG. 27 of the second embodiment is an application example of the flowchart shown in FIG. 19 of the first embodiment. The same step numbers as in the flowchart shown in FIG. 19 denote the same processing operations, and a detailed description thereof will be omitted.

Especially, in FIG. 27, processing after first leading edge data Nr and first trailing edge data Nf are acquired is different from FIG. 19.

More specifically, when a leading edge detection flag R_flg=1, and a trailing edge detection flag F_flg=1, it is determined in step S314 whether pixel data (Data) is equal to or larger than the threshold value Vth'.

When the pixel data (Data) is smaller than the threshold value Vth' (NO in step S314), the flow advances to step S317 to cause the arithmetic control circuit 83 to execute control to decrease the light amount of the infrared LED 31 by a predetermined amount. In this case, to drive the sensor unit 1L (1R) again, the flow returns to step S202 to reset various initial values related to the sensor unit 1L (1R), and the subsequent processing is repeatedly performed.

When the light amount of the infrared LED 31 decreases, and the level of pixel data becomes equal to or more than the threshold value Vth', the leading edge point r0 and trailing edge point f1 of the light-shielded range and the trailing edge point f0 and leading edge point r1 of the light amount distribution corresponding to the direct reflected light are correctly detected. For this reason, the same processing as in FIG. 19 of the first embodiment can be executed.

As described above, according to the second embodiment, in addition to the effect described in the first embodiment, even when the line CCD 41 in the sensor unit is saturated, the sensor unit is driven again after the light amount level of the infrared LED 31 is decreased. Light amount control is thus executed such that a light amount distribution corresponding to direct reflected light can be acquired within the dynamic range of the line CCD 41. Accordingly, the coordinates can accurately be detected independently of the degree of direct reflected light.

Third Embodiment

In the second embodiment, when the light amount of direct reflected light is so large that the line CCD 41 is saturated, the light amount of the infrared LED 31 is decreased, and the sensor unit 1L (1R) is driven again. Accordingly, the light amount distribution in the unsaturated state of the line CCD 41 is acquired again, and feature points are correctly detected.

In this case, however, the sensor unit 1L (1R) must be driven twice or more until final coordinate calculation. For this reason, although the coordinate calculation accuracy increases, the coordinate output speed decreases in accordance with the number of times of re-driving.

In the third embodiment, an arrangement will be described, in which considering even placing priority not on the coordinate calculation accuracy but on the coordinate output speed for a certain application purpose or object, coordinate calculation is implemented while satisfying the necessary and sufficient coordinate calculation accuracy without decreasing the coordinate output speed.

Figure 28:
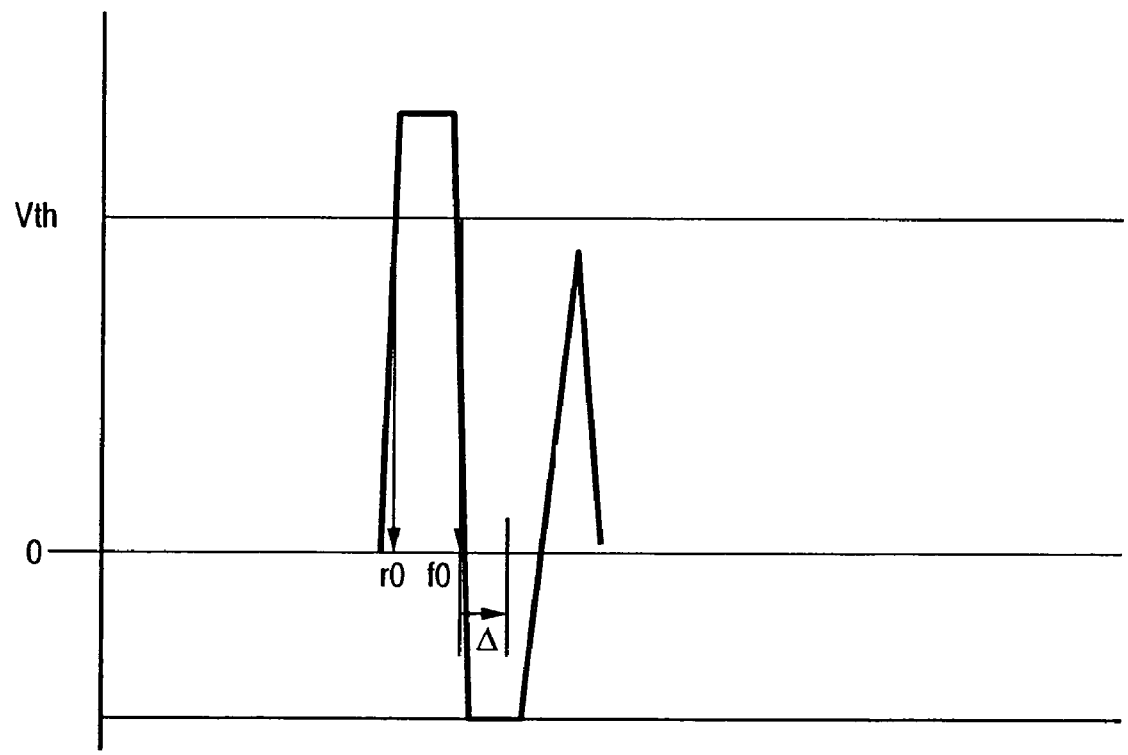
FIG. 28 is a graph for explaining a light amount change in a light amount distribution obtained by the sensor unit when direct reflection from a pointer according to the third embodiment of the present invention exists.

As described above, when the sensor unit 1L (1R) is saturated, a light amount distribution as shown in FIG. 23 is obtained. When the pixel data change ratio is calculated for the light amount distribution by using equation (2), the light amount distribution shown in FIG. 23 changes to that shown in FIG. 28.

As described above in the second embodiment, referring to FIG. 28, a leading edge point r0 of the light-shielded range and a trailing edge point f0 of the light amount distribution corresponding to direct reflected light before saturation of a line CCD 41 can be detected. After that, the light amount distribution will not exceed a threshold value Vth.

In the third embodiment, when the sign of the pixel data change ratio changes to minus (−), the trailing edge point f0 of the light amount distribution corresponding to direct reflected light is determined as the center of the light amount distribution.

The trailing edge point f0 of the light amount distribution corresponding to direct reflected light need not always be determined as the center of the light amount distribution on the basis of the sign of the pixel data change ratio. Alternatively, a new threshold value for determination may be set, and determination may be done on the basis of it. When the shape or size of the pointer is known, a pixel number obtained by adding a predetermined offset Δ to the determined trailing edge point f0 may be determined as the center of the pixel data distribution corresponding to direct reflected light.

Feature point detection processing of the third embodiment will be described below with reference to FIG. 29.

Figure 29:
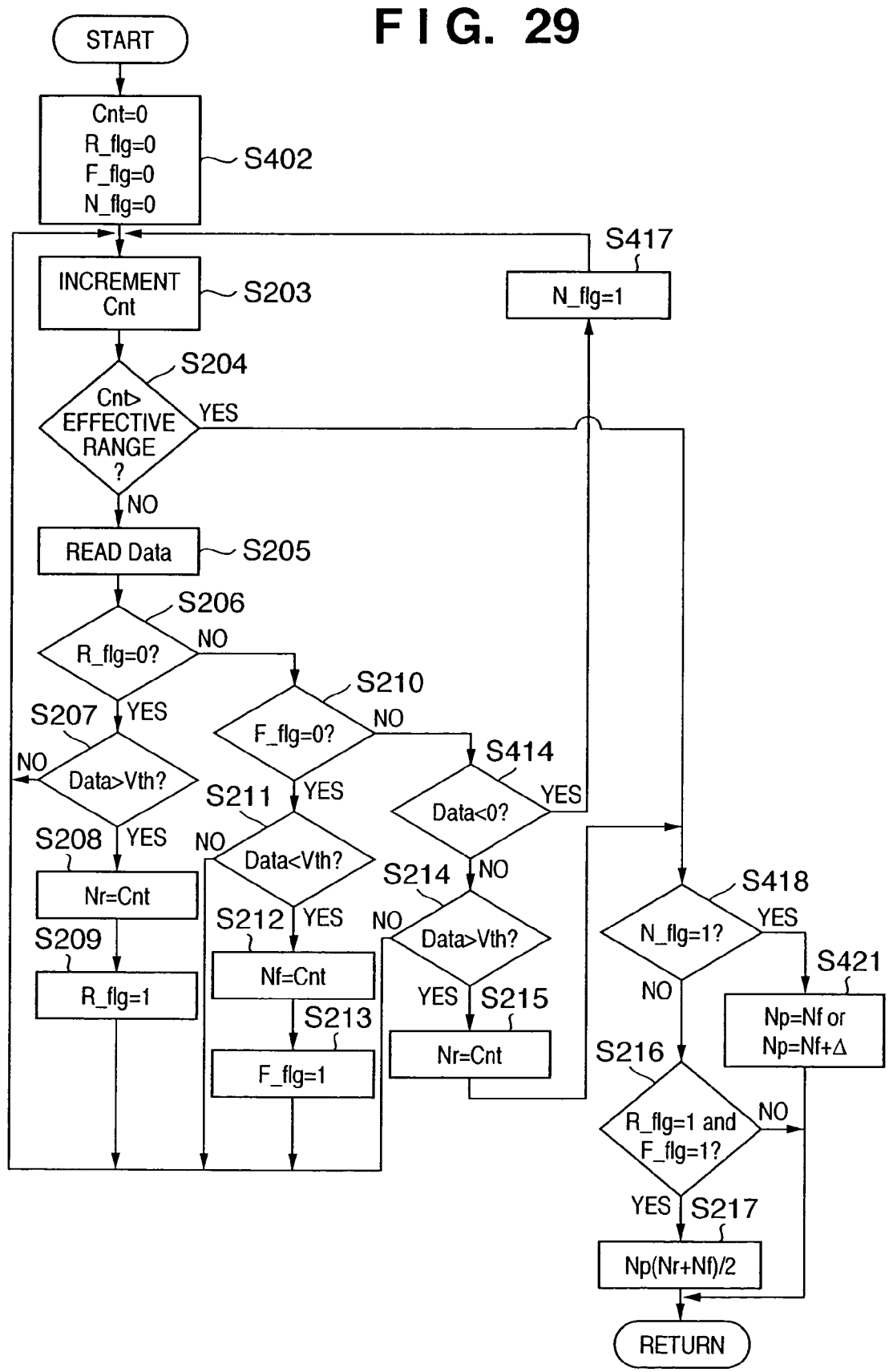
FIG. 29 is a flowchart showing feature point detection processing according to the third embodiment of the present invention.

FIG. 29 is a flowchart showing feature point detection processing according to the third embodiment of the present invention.

The flowchart shown in FIG. 29 of the third embodiment is an application example of the flowchart shown in FIG. 19 of the first embodiment. The same step numbers as in the flowchart shown in FIG. 19 denote the same processing operations, and a detailed description thereof will be omitted.

Especially, in FIG. 29, processing after first leading edge data Nr and first trailing edge data Nf are acquired is different from FIG. 19.

In step S402, a counter Cnt, leading edge detection flag R_flg, and trailing edge detection flag F_flg are initialized. In addition, a minus flag N_flg (0: sign of pixel data is minus, and 1: sign of pixel data is plus) representing that the sign of pixel data is minus is initialized.

After processing in steps S203 to S210, when the leading edge detection flag R_flg=1, and the trailing edge detection flag F_flg=1, it is determined in step S414 whether the sign of pixel data (Data) is minus, i.e., the pixel data (Data) is smaller than 0.

If the sign of pixel data (Data) is minus (YES in step S414), the flow advances to step S417 to set the minus flag N_flg=1. The flow returns to step S203.

The pixel data will no longer exceed the threshold value Vth. For this reason, even when the pixel data is loaded up to the end of the effective range of the line CCD 41, the values of the trailing edge data Nf and leading edge data Nr will not change.

If it is determined in step S204 that the pixel number indicated by the value of the counter Cnt falls outside the effective detection range of the line CCD 41 (YES in step S204), it is determined in step S418 whether the minus flag N_flg=1. If the minus flag N_flg≠1 (NO in step S418), the flow advances to step S216. On the other hand, if the minus flag N_13 flg=1 (YES in step S418), the flow advances to step S421 to substitute the trailing edge data Nf (or Nf+Δ) as an intermediate point Np of the pixel data distribution coarsening to direct reflected light. The processing is ended.

As described above, according to the third embodiment, in addition to the effect described in the first embodiment, even when the line CCD 41 in the sensor unit is saturated, angle information that holds a necessary and sufficient accuracy can be detected without decreasing the coordinate output speed.

The embodiments of the present invention have been described above in detail. The present invention can be applied to an embodiment as, e.g., a system, apparatus, method, program, or storage medium. More specifically, the present invention can be applied to a system including a plurality of devices or an apparatus including a single device.

The present invention is also achieved even by supplying a software program (in the embodiments, a program corresponding to the flowcharts shown in the drawings) which implements the functions of the above-described embodiments to the system or apparatus directly or from a remote site and causing the computer of the system or apparatus to read out and execute the supplied program code.

Hence, the program code itself, which is installed in a computer to implement the functional processing of the present invention by the computer, also implements the present invention. That is, a computer program itself, which implements the functional processing of the present invention, is also incorporated in the present invention.

In this case, the program can take any form such as an object code, a program to be executed by an interpreter, or script data to be supplied to the OS as long as the functions of the program can be obtained.

As a recording medium for supplying the program, for example, a floppy (registered trademark) disk, hard disk, optical disk, magnetooptical disk, MO, CD-ROM, CD-R, CD-RW, magnetic tape, nonvolatile memory card, ROM, or DVD (DVD-ROM or DVD-R) can be used.

As another program supply method, a client computer may be connected to a homepage on the Internet using a browser in the computer, and the computer program itself of the present invention or a compressed file containing an automatic install function may be downloaded from the homepage to a recording medium such as a hard disk. A program code that constitutes the program of the present invention may be divided into a plurality of files, and the files may be downloaded from different homepages. That is, a WWW server which causes a plurality of users to download a program file that causes a computer to implement the functional processing of the present invention is also incorporated in the present invention.

The program of the present invention may be encrypted, stored in a storage medium such as a CD-ROM, and distributed to users. Any user who satisfies predetermined conditions may be allowed to download key information for decryption from a homepage through the Internet, execute the encrypted program using the key information, and install the program in the computer.

The functions of the above-described embodiments are implemented not only when the readout program is executed by the computer but also when the OS or the like, which is running on the computer, performs part or all of actual processing on the basis of the instructions of the program.

The functions of the above-described embodiments are also implemented when the program read out from the storage medium is written in the memory of a function expansion board inserted into the computer or a function expansion unit connected to the computer, and the CPU of the function expansion board or function expansion unit performs part or all of actual processing on the basis of the instructions of the program.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application No. 2003-286158 filed on Aug. 4, 2003, which is hereby incorporated by reference herein.

What is claimed is:

1. A coordinate input apparatus which calculates a pointed position on a coordinate input region, comprising:
    light-receiving means arranged in the coordinate input region;
    reflection means, arranged at a peripheral portion of the coordinate input region, for reflecting incident light;
    light-emitting means for illuminating the coordinate input region with light;
    angle calculation means for calculating angle information on the basis of a light amount distribution obtained from said light-receiving means; and
    calculation means for calculating coordinates of a pointed position of pointing means on the basis of, of a plurality of pieces of angle information calculated by said angle calculation means, angle information corresponding to direct reflected light from said pointing means, the direct reflected light being generated by said light-emitting means.

2. The apparatus according to claim 1, further comprising determination means for determining whether a light amount obtained from said light-receiving means is less than a predetermined threshold value, and
    control means for, when said determination means determines that the light amount is less than the predetermined threshold value, executing control to decrease a light emission amount of said light-emitting means by a predetermined amount, cause said light-emitting means to emit light, and cause said angle calculation means to execute angle calculation again for a light amount distribution obtained from said light-receiving means by the light emission.

3. The apparatus according to claim 1, further comprising determination means for determining whether a light amount obtained from said light-receiving means is less than a predetermined threshold value, and
    control means for executing control to shorten a light reception time by said light-receiving means by a predetermined time and cause said angle calculation means to execute angle calculation again for a light amount distribution obtained from said light-receiving means within the predetermined time.

4. The apparatus according to claim 1, wherein said calculation means calculates the coordinates of the pointed position on the basis of, of the plurality of pieces of angle information, angle information corresponding to a light amount level having a minus sign.

5. The apparatus according to claim 1, wherein said calculation means calculates the coordinates of the pointed position on the basis of, of the plurality of pieces of angle information, angle information obtained by adding a predetermined value to angle information corresponding to a light amount level having a minus sign.

6. The apparatus according to claim 1, further comprising display means, said display means being superposed on the coordinate input region.

7. A control method of a coordinate input apparatus which calculates a pointed position on a coordinate input region on the basis of a light amount distribution obtained by a light-receiving unit arranged in the coordinate input region from reflected light from a reflection unit which is arranged at a peripheral portion of the coordinate input region to reflect incident light, comprising:
    an angle calculation step of calculating angle information on the basis of the light amount distribution obtained from the light-receiving unit; and
    a calculation step of calculating coordinates of a pointed position of pointing means on the basis of, of a plurality of pieces of angle information calculated in the angle calculation step, angle information corresponding to direct reflected light from the pointing means, the direct reflected light being generated by a light-emitting unit.

* * * * *

UNITED STATES PATENT AND TRADEMARK OFFICE
CERTIFICATE OF CORRECTION

PATENT NO. : 7,283,128 B2  Page 1 of 1
APPLICATION NO. : 10/901148
DATED : October 16, 2007
INVENTOR(S) : Sato It is certified that error appears in the above-identified patent and that said Letters Patent is hereby corrected as shown below:

COLUMN 1:
Line 31, "that-shields" should read -- that shields --.

COLUMN 15:
Line 6, "accumulate" should read -- accumulates --.

COLUMN 19:
Line 58, "$N_{13}flg =1$" should read -- $N\_flg =1$ --.

COLUMN 21:
Line 25, "comprising" should read -- comprising: --;
Line 28, "value, and" should read -- value; and --;
Line 38, "comprising" should read -- comprising: --; and
Line 41, "value, and" should read -- value; and --.

Signed and Sealed this

Second Day of September, 2008

JON W. DUDAS
*Director of the United States Patent and Trademark Office*